United States Patent [19]
Mills

[11] Patent Number: 5,454,766
[45] Date of Patent: Oct. 3, 1995

[54] CONTINUOUSLY VARIABLE TRANSMISSION HAVING A DOUBLE ECCENTRIC SHAFT AND A WORM GEAR ADJUSTING MECHANISM

[75] Inventor: Ned D. Mills, Kennewick, Wash.

[73] Assignee: Speed Control, Inc., Kennewick, Wash.

[21] Appl. No.: 265,680

[22] Filed: Jun. 24, 1994

[51] Int. Cl.⁶ ............................. F16H 3/44; F16H 29/16; F16H 29/20; F16C 3/18
[52] U.S. Cl. .................... 475/170; 475/176; 475/180; 74/571 M; 74/594.2; 74/117; 280/238
[58] Field of Search ..................... 475/162, 169, 475/170, 176, 180; 280/259, 236, 238, 260; 74/117, 571 M, 594.2, 836

[56] References Cited

U.S. PATENT DOCUMENTS

| | | | |
|---|---|---|---|
| 363,629 | 5/1887 | Grant | 74/571 M |
| 1,832,384 | 11/1931 | Hall et al. | 74/571 M X |
| 2,209,417 | 7/1940 | Obermoser | 74/571 M X |

FOREIGN PATENT DOCUMENTS

| | | | |
|---|---|---|---|
| 332825 | 12/1935 | Italy | 74/117 |
| 1147957 | 3/1959 | Japan | 74/117 |
| 63-145851 | 6/1988 | Japan | 475/170 |
| 63-285358 | 11/1988 | Japan | 475/162 |

*Primary Examiner*—Charles A. Marmor
*Assistant Examiner*—Nathan O. Jensen
*Attorney, Agent, or Firm*—Wells, St. John, Roberts, Gregory & Matkin

[57] ABSTRACT

A hybrid transmission provides a continuous range of reduced output speeds in a coaxial relationship about a common central axis within a surrounding cylindrical housing. The input shaft speed is increased through a planetary transmission having a sun gear fixed to a variable eccentric shaft. The eccentric shaft is surrounded by an orbiter and spaced anchor and drive vanes, which are interconnected by a plurality of anchor and drive vanes. Output speed is varied by change of the degree of eccentricity, using a worm gear drive interposed between inner and outer eccentrics within the eccentric shaft. control is achieved through shift rings that rotate a worm in response to external cable tension.

67 Claims, 18 Drawing Sheets

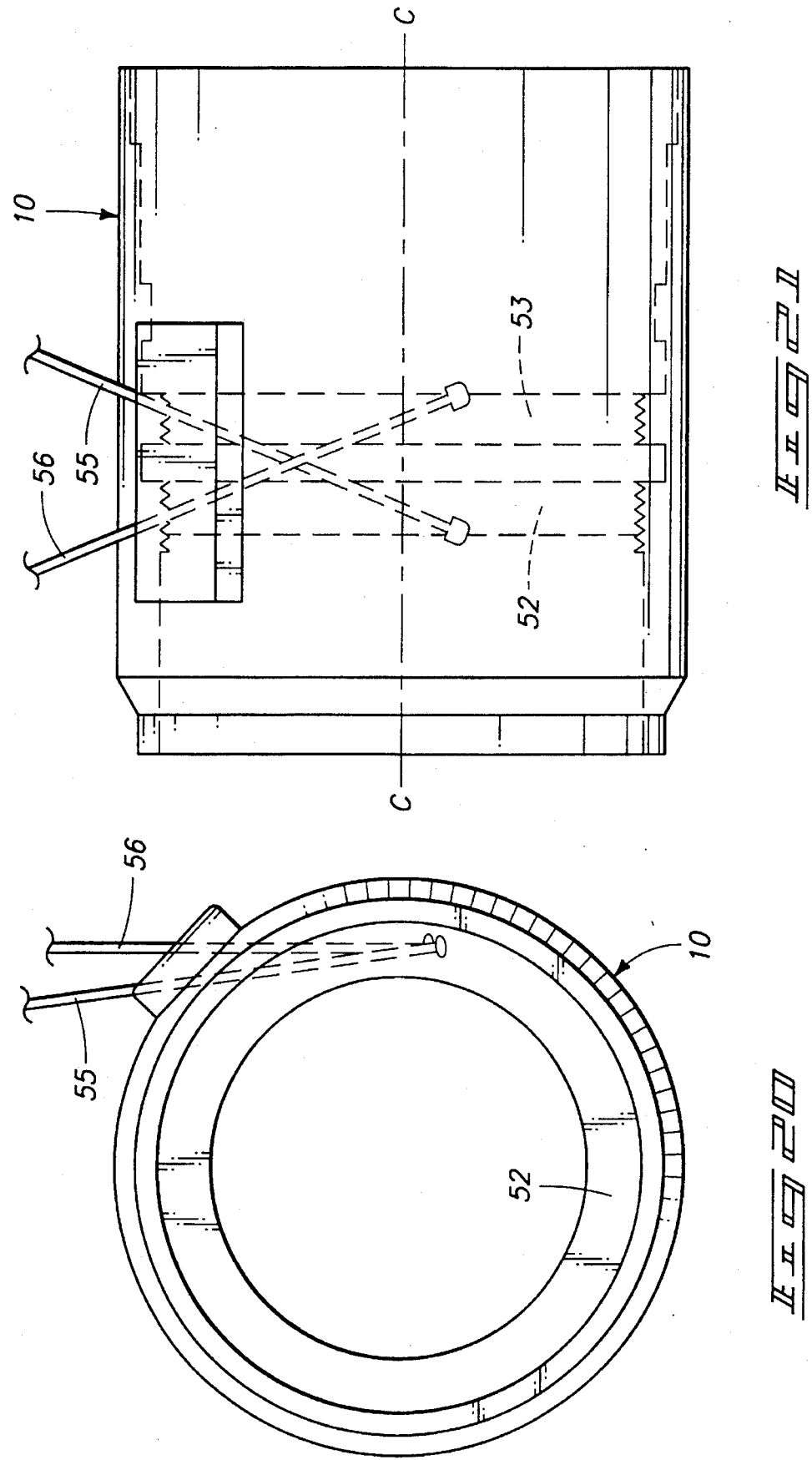

CONTINUOUSLY VARIABLE TRANSMISSION HAVING A DOUBLE ECCENTRIC SHAFT AND A WORM GEAR ADJUSTING MECHANISM

TECHNICAL FIELD

This disclosure relates to a continuously variable transmission, and is specifically directed to such a transmission designed for use in bicycles.

BACKGROUND OF THE INVENTION

Changeable speed transmissions for bicycles have been proposed and used for many years. These have included various rear wheel hub transmissions, which typically achieved two or three specified speed reductions, as well as derailleur systems, which use the driving chain as a force transmitting element between selectable rear and/or front sprockets.

Both prior systems have readily-identifiable drawbacks. The limited space available within a rear wheel hub of a bicycle places severe limits on the amount of mechanism that can be included within it, and thereby prevents one from designing such a transmission with many speed changes. Derailleurs, while mechanically simple and externally accessible for adjustment and repair, exert side loading forces on driving chains designed for power transmission in a straight line. They also are subject to the frequent need for adjustment due to wear on both the chain and sprockets. The entire derailleur system is exposed to the elements and requires frequent cleaning and lubrication.

The present invention was developed in an effort to provide a continuously variable transmission within the conventional frame components of a bicycle. It is preferably located within the bottom bracket shell of the bicycle frame, but its components can be divided between that location and the interior of the rear wheel hub. In addition, the transmission itself is not limited to bicycle applications, but can be applied to other driving combinations where continuously variable speed changes are desired.

The present invention utilizes pivoting vanes for continuously modifying rotational speed between coaxial driving and driven rotational elements. Prior attempts to design similar transmissions have resulted in detectable speed variations during each revolution of the equipment. The present equipment smooths the speed variations and provides a practical solution to many of the limitations previously encountered.

BRIEF DESCRIPTION OF THE DRAWINGS

Preferred embodiments of the invention are described below with reference to the accompanying drawings, which are briefly described below.

FIG. 20 is a side view, illustrating the cable interconnections to the shift rings in dashed lines;

FIG. 21 is a front elevation view of the housing, also showing the interconnection between the cables and shift rings in dashed lines;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The general nature of the continuously variable transmission can best be understood from FIGS. 1–9. The transmission details, which have been developed specifically for use in a bicycle, are illustrated within a bicycle environment. However, it is to be understood that the transmission components can be modified to adapt them to other applications on bicycles.

Figure 1:
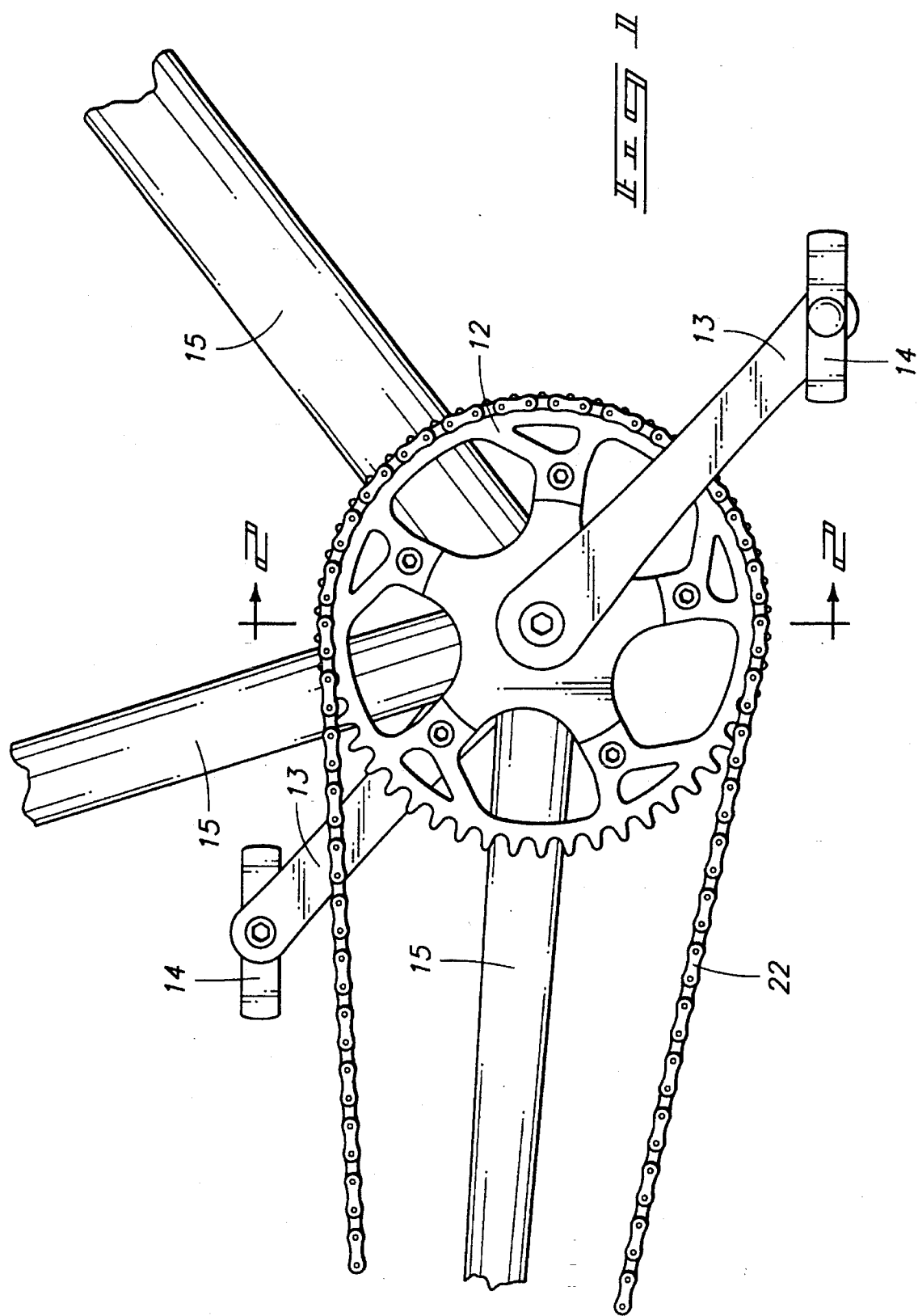
FIG. 1 is a fragmentary side elevation view of the bottom bracket area of a bicycle equipped with the present continuously variable transmission.
Figure 2:
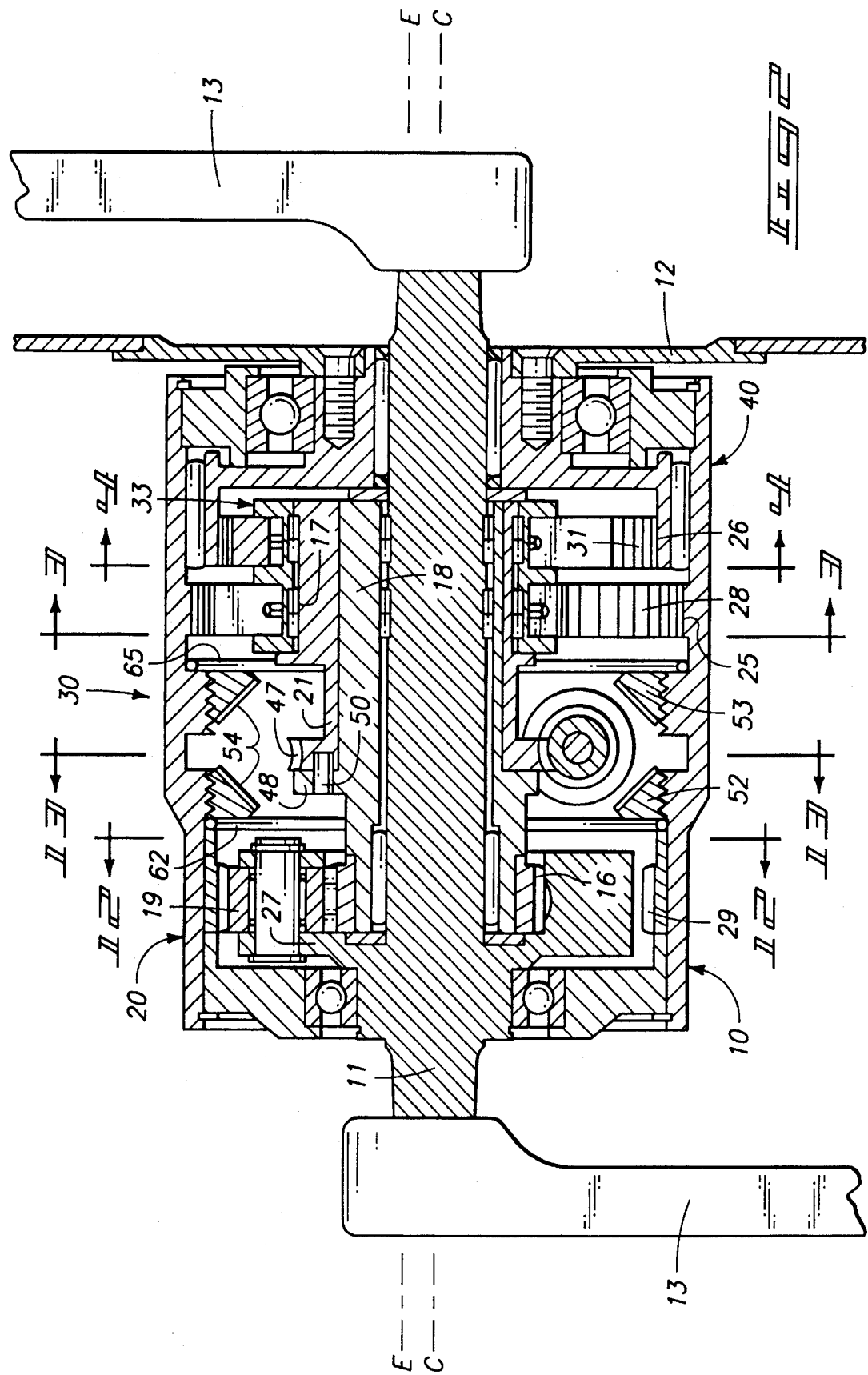
FIG. 2 is an enlarged axial section taken along line 2—2 in FIG. 1.
Figure 3:
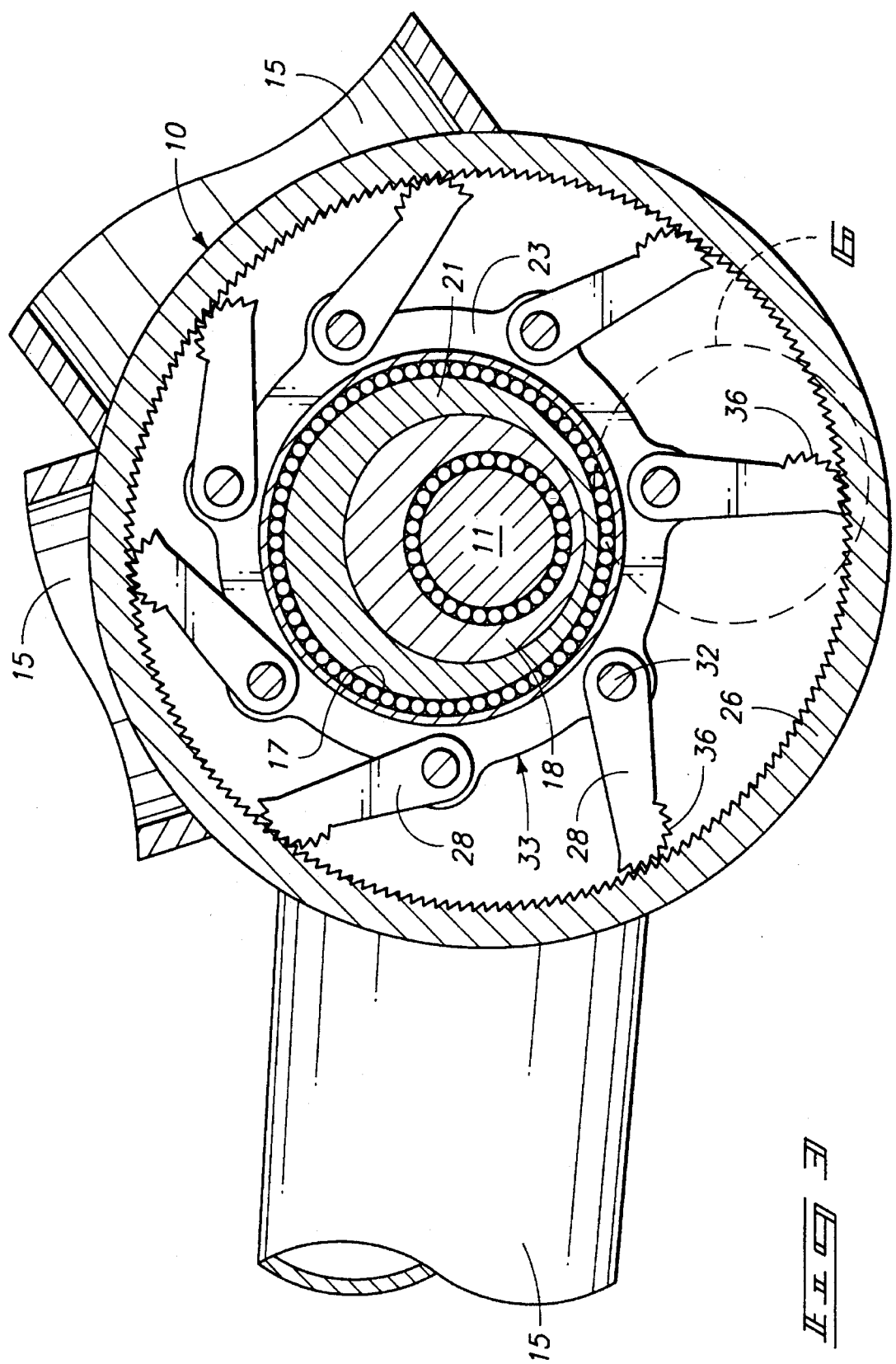
FIG. 3 is a cross-sectional view of the anchor vanes as seen along line 3—3 in FIG. 2.
Figure 4:
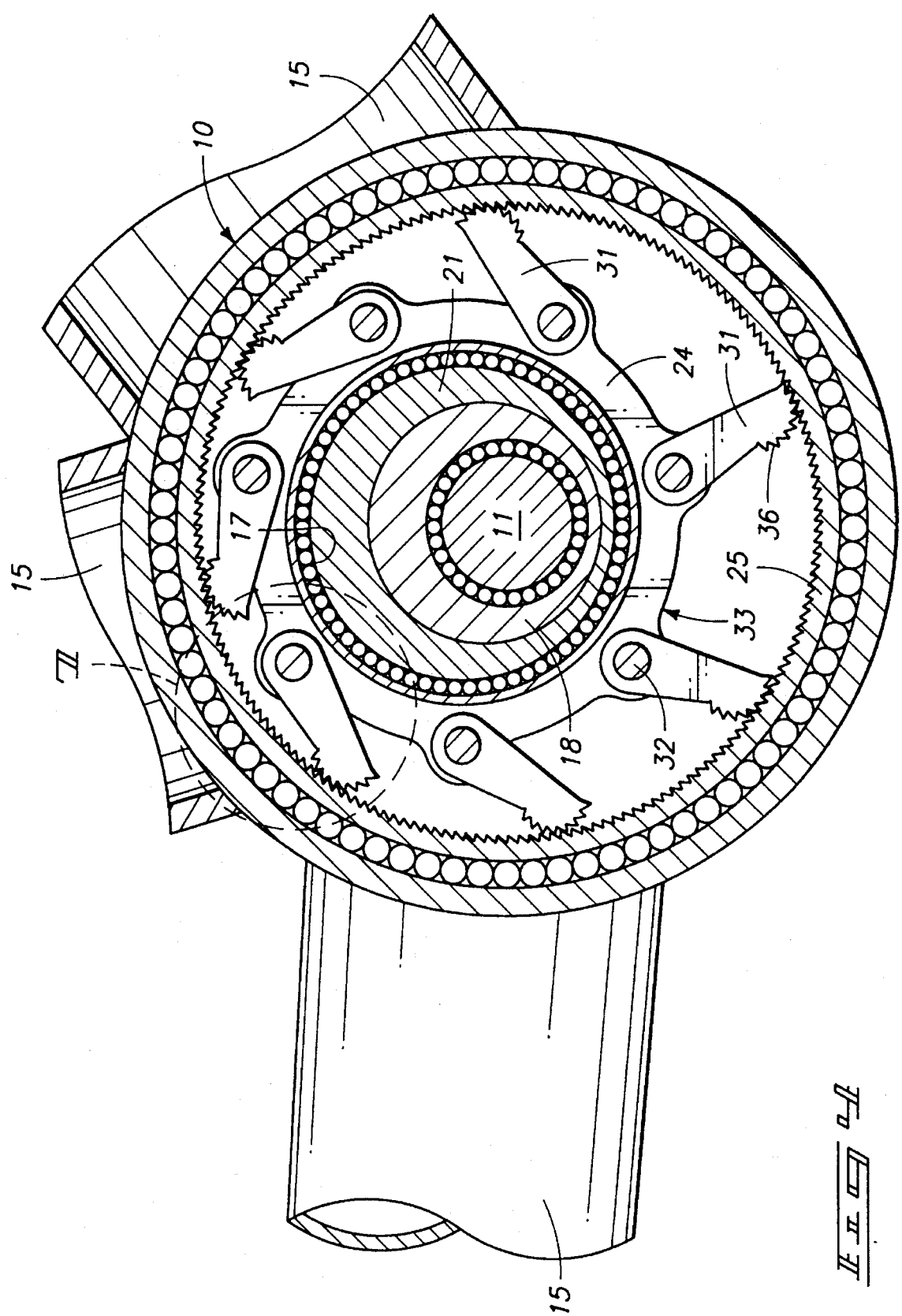
FIG. 4 is a cross-sectional view of the drive vanes as seen along line 4—4 in FIG. 2.

The continuously variable transmission is located within a housing 10, which has a generally cylindrical exterior shape. The transmission housing 10 is arranged about a first central axis designated by line C—C (FIG. 2).

In a bicycle application, housing 10 might constitute the bottom bracket shell of the bicycle frame. It supports the bicycle crank and interconnects conventional bicycle tubular frame components generally illustrated at 15. Bicycle frame construction is well known to those skilled in the field of bicycle design. No further description regarding the incorporation of housing 10 within a bicycle frame is believed to be necessary in order to enable those skilled in this field to adopt and use this invention.

Coaxial first and second rotatable members are supported within the housing 10 for independent rotation about the central axis C—C. The first rotatable member, in the illustrated application of the present transmission to a bicycle, comprises a crank shaft 11 having conventional pedal arms 13 and pedals 14 fixed to it. The second rotatable member 12 is in the form of an output sprocket constructed from a conventional spider and surrounding chain ring operably engaged by a conventional bicycle chain 22. The second rotatable member is coaxially supported by the first rotatable member 11 by a conventional roller bearing interposed between them.

An eccentric shaft is operably connected to the first rotatable member 11, which imparts rotational movement to the eccentric shaft 16 about the central axis C—C. Eccentric shaft includes an inner eccentric element 18 and an outer eccentric element 21. It has a cylindrical surface 17 formed about an eccentric axis E—E that is parallel to the central axis C—C and radially adjustable relative to it. The inner and outer eccentric elements 18, 21 are independently rotatable relative to one another.

The inner eccentric element 18 has an inner cylindrical surface rotatably mounted about the first rotatable member 11 and an eccentric outer cylindrical surface centered about an eccentric axis E—E.

The outer eccentric element 21 has an inner cylindrical surface rotatably mounted about the eccentric outer cylindrical surface of inner eccentric element 18 and an eccentric outer cylindrical surface. The eccentric outer cylindrical surface of outer eccentric element 21 is the previously-described cylindrical surface 17 of the eccentric shaft.

An adjusting gear mechanism, generally indicated at 30 in the drawings, is operably connected between the inner and outer eccentric elements 18, 21. It is selectively operable to vary the radial displacement of eccentric axis E—E relative to the central axis C—C of the housing 10. This displacement can be varied from zero, wherein the two axes are coincident, to a maximum radial displacement governed by the physical limits of the adjusting gear mechanism 30. The adjusting gear mechanism will be described in detail below.

Figure 12:
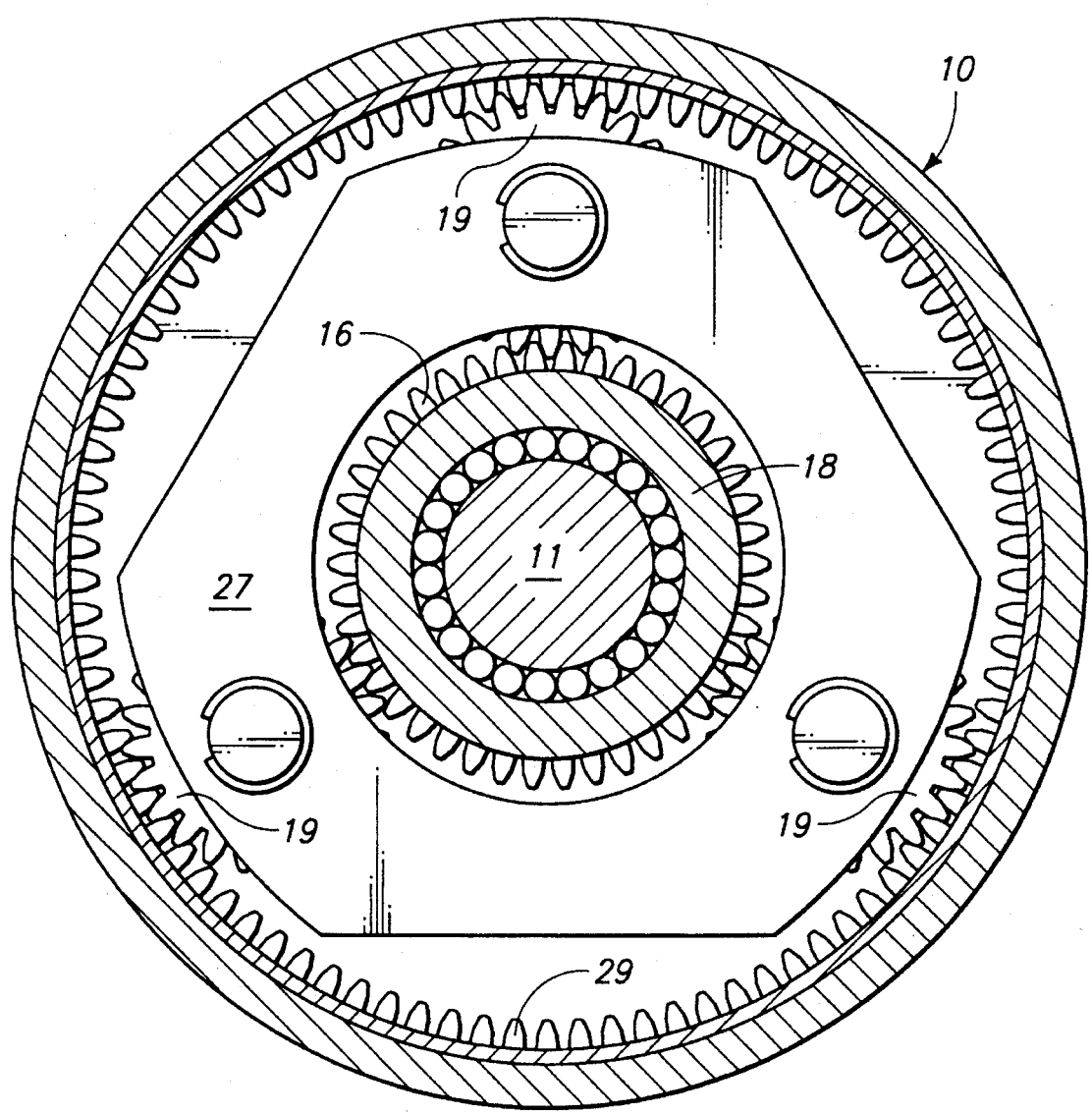
FIG. 12 is an enlarged cross-sectional view taken along line 12—12 in FIG. 2.

Because of the very low speed reductions obtained within the continuous variable transmission 40, an overdrive input is desired upstream from it. This is provided by inclusion of planetary transmission 20 (see FIGS. 2 and 12).

Planetary transmission 20 includes a driven sun gear 16 fixed to the inner end of inner eccentric element 18 and centered about axis E—E. It is drivingly engaged by three planetary gears 19 arranged for free rotation on a planetary carrier 27. Carrier 27 is fixed on the crank shaft 11 and is coaxially joined within housing 10 for rotation about axis e—e. The planetary gears 19 also mesh with a surrounding ring gear 29 fixed to housing 10. As shaft 11 is turned, sun gear 16 will be rotated at a desired multiplication of its rotational speed, the multiplier being a function of the gear sizes provided within planetary transmission 20.

An infinitely variable transmission 40 included within housing 10 comprises first axial elements 23 and 24. The first axial elements 23, 24 are centered about the eccentric axis E-E and rotate in unison about it. Elements 23 and 24 are illustrated as axial segments of an orbiter 33 which surrounds and is rotatably journalled on the cylindrical surface 17 of eccentric shaft 16.

Second axial elements 25 and 26 are also located in housing 10. The second axial elements 25, 26 are centered about the central axis C—C. They are radially displaced from and respectively face the first axial elements 23, 24 (see FIG. 2). The second axial element 25 is illustrated as an anchor ring formed integrally in the interior of housing 10. The second axial element 26 is illustrated as a rotatable drive ring physically joined to the illustrated output sprocket. Both of the second axial elements have a continuous series of inclined axial teeth formed across their inner cylindrical surfaces.

The first axial elements 23, 24, which are included within the orbiter 33, are operably connected to the crank shaft comprising the first rotatable member 11 through the eccentric shaft 17, the adjusting gear mechanism 30, and the planetary transmission 20.

The second axial elements include an anchor ring that serves as one axial element 25 and is fixed to the bottom bracket shell that serves as the surrounding transmission housing 10. An annular drive ring serves as a second axial element 26 and is operably connected to the output sprocket that serves as a second rotatable member 12.

At least one of the first or second axial elements has a circular pattern of teeth formed about it. As illustrated, these teeth are formed on the second axial elements (the anchor ring and drive ring) 25 and 26.

The first axial elements 23, 24 and the corresponding second axial elements 25, 26 are operably engaged by first and second groups of identical vanes designated as anchor vanes 28 and drive vanes 31. Each vane has a first or inner end operably connected to one axial element for pivotal motion about a vane axis that is parallel to the central axis C—C. Each vane also has a second or outer end having a plurality of teeth 36 complementary to and drivingly meshing with the circular pattern of teeth on the axial elements during a portion of each complete revolution of the eccentric shaft.

More specifically, in the illustrated embodiment, the inner end of each anchor and drive vane 28, 31 is pivotally connected about the first axial elements 23, 24 respectively on the illustrated orbiter 33. The outer end of each vane includes axial teeth 36 complementary to the previously-described teeth on the anchor and drive rings.

The teeth 36 are arranged about an arc that is not centered about the pivot axis of the vane on which they are formed. Thus, the working length of the vane relative to its vane axis varies as a function of the angular position of the vane relative to the axial element to which its opposite end is connected. The importance of this relationship will be expanded upon in the following discussion.

In the preferred embodiment shown in FIGS. 1–9, the orbiter 33, which includes the first axial elements 23 and 24 interconnected to the vanes 28 and 31, is a unitary cylindrical collar journalled about the cylindrical surface 17 formed about the outer eccentric element 21. It includes protruding annular rings including enlargements for bearings that support the pivot pins 32. Each vane thereby pivots relative to the orbiter 33 about a fixed axis on the movable orbiter. In this preferred embodiment, the anchor and drive vanes 28, 31 are pivotally mounted on common pivot pins 32 spaced equiangularly about the eccentric axis E—E.

Figure 9:
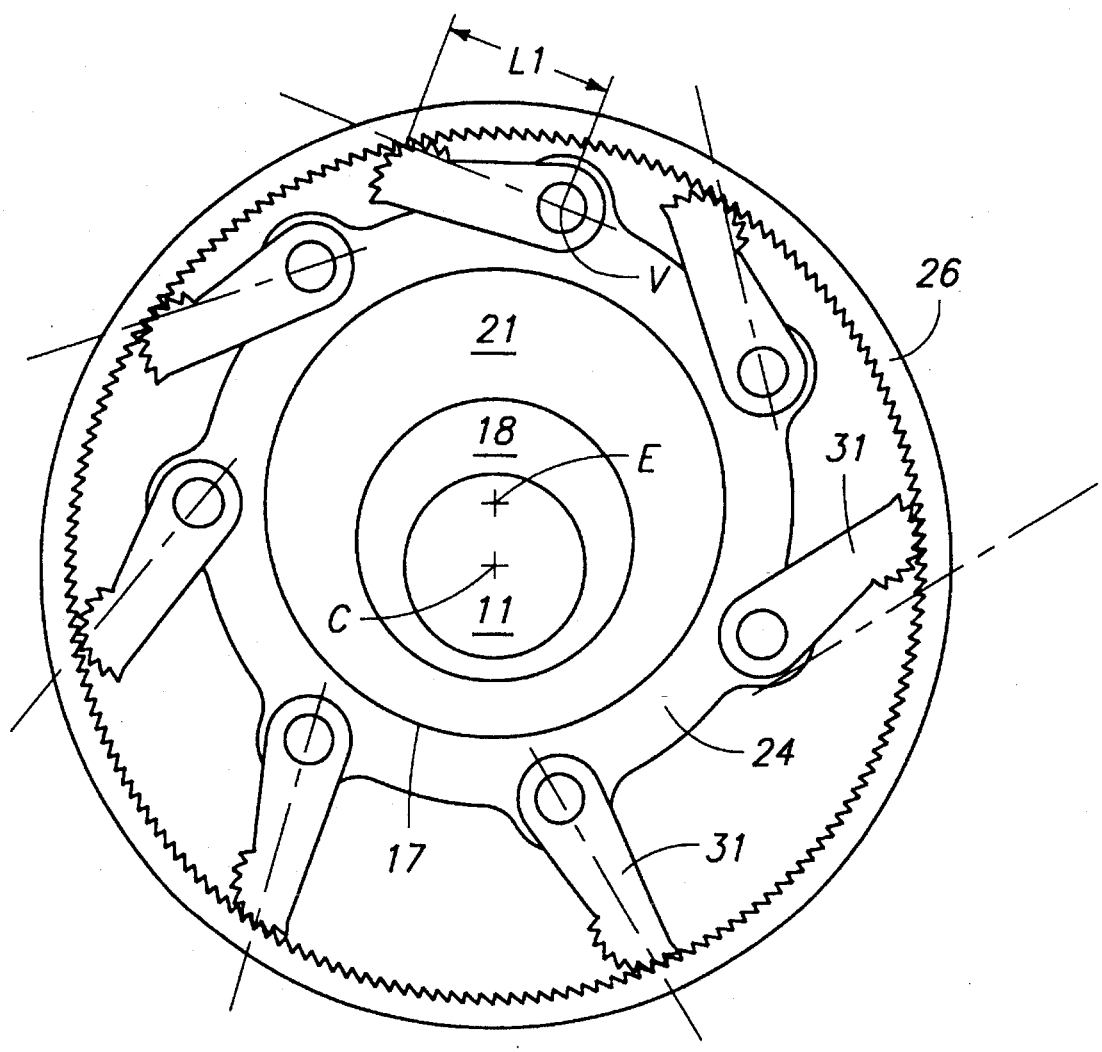
FIG. 9 is a similar view illustrating operation of the drive vanes.

For purposes of this technical discussion, the working length of each vane shall be defined as the longitudinal length between the vane axis on the orbiter (whether the axis is fixed or movable on the orbiter structure) and the center point of driving engagement of the vane teeth 36 at its opposite or outer end (which is movable about the end of the vane). Referring to FIG. 9, the dimension designated as L1 illustrates the minimum working length of the drive vane 31. Similarly, in FIG. 8 the line L2 designates the maximum working length of an anchor vane 28.

Figure 6:
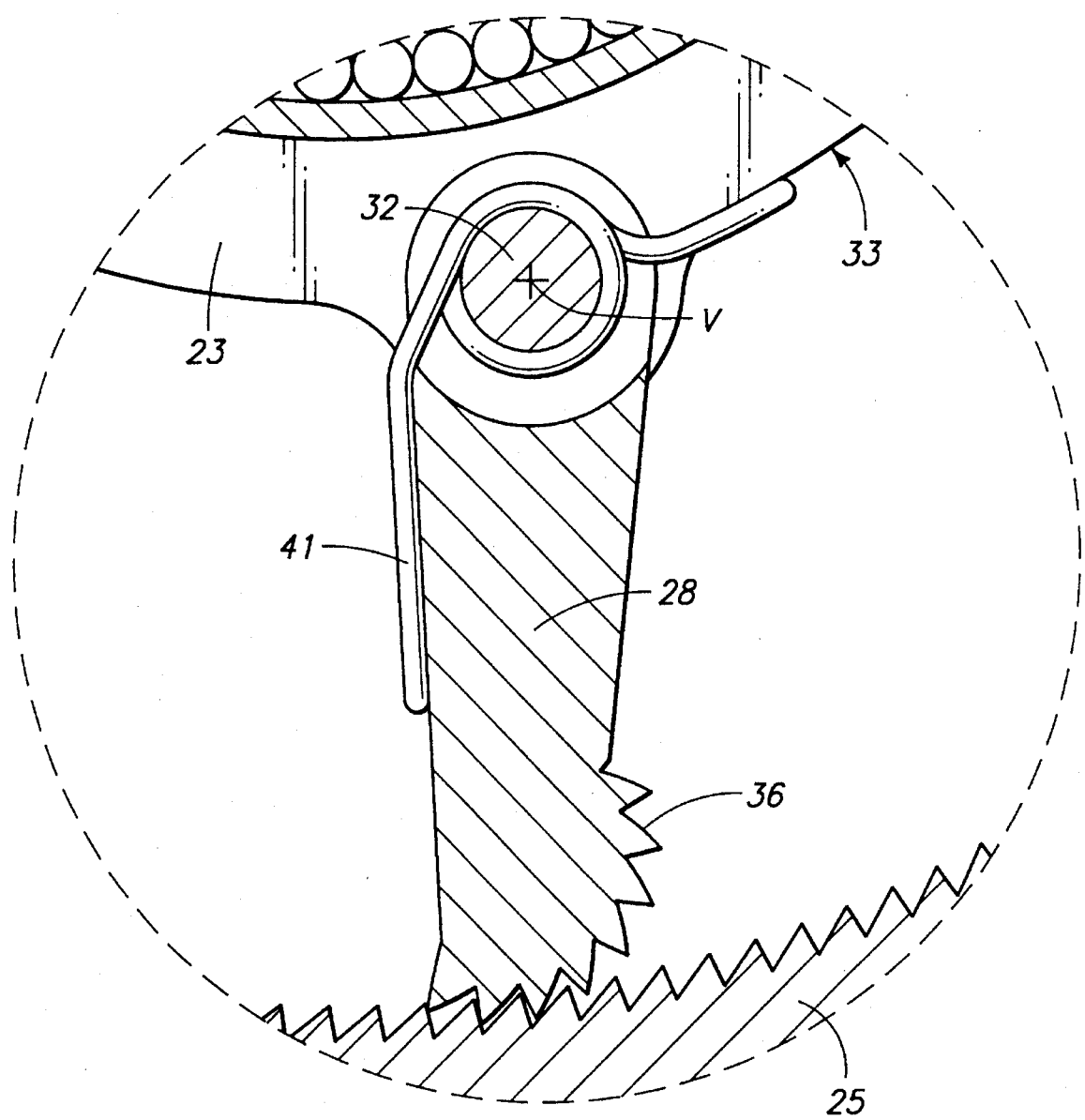
FIG. 6 is an enlarged cross-sectional view through the anchor vane encircled by dashed line 6 in FIG. 3.
Figure 7:
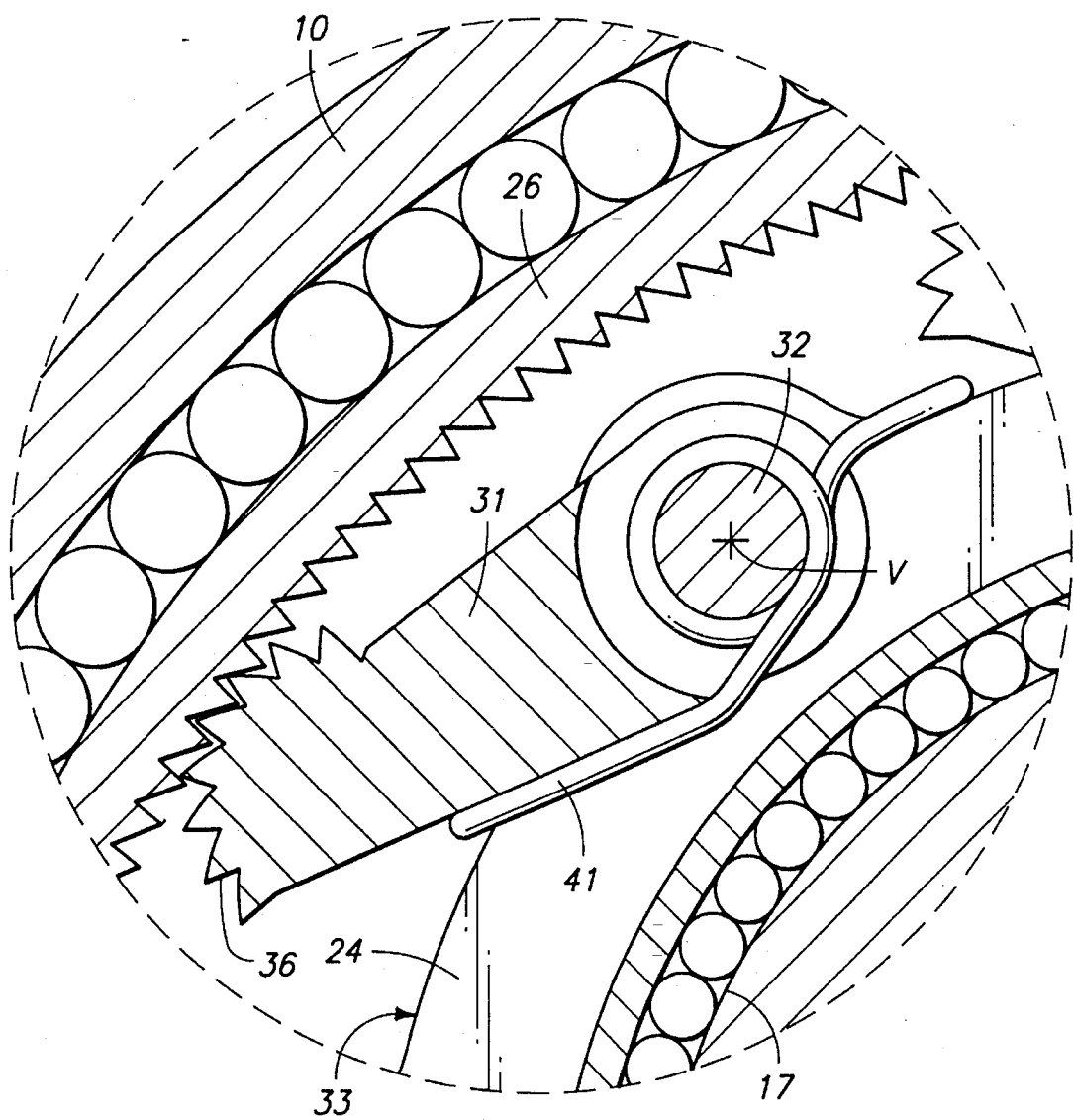
FIG. 7 is an enlarged cross-sectional view through the drive vane encircled by dashed line 7 in FIG. 4.
Figure 8:
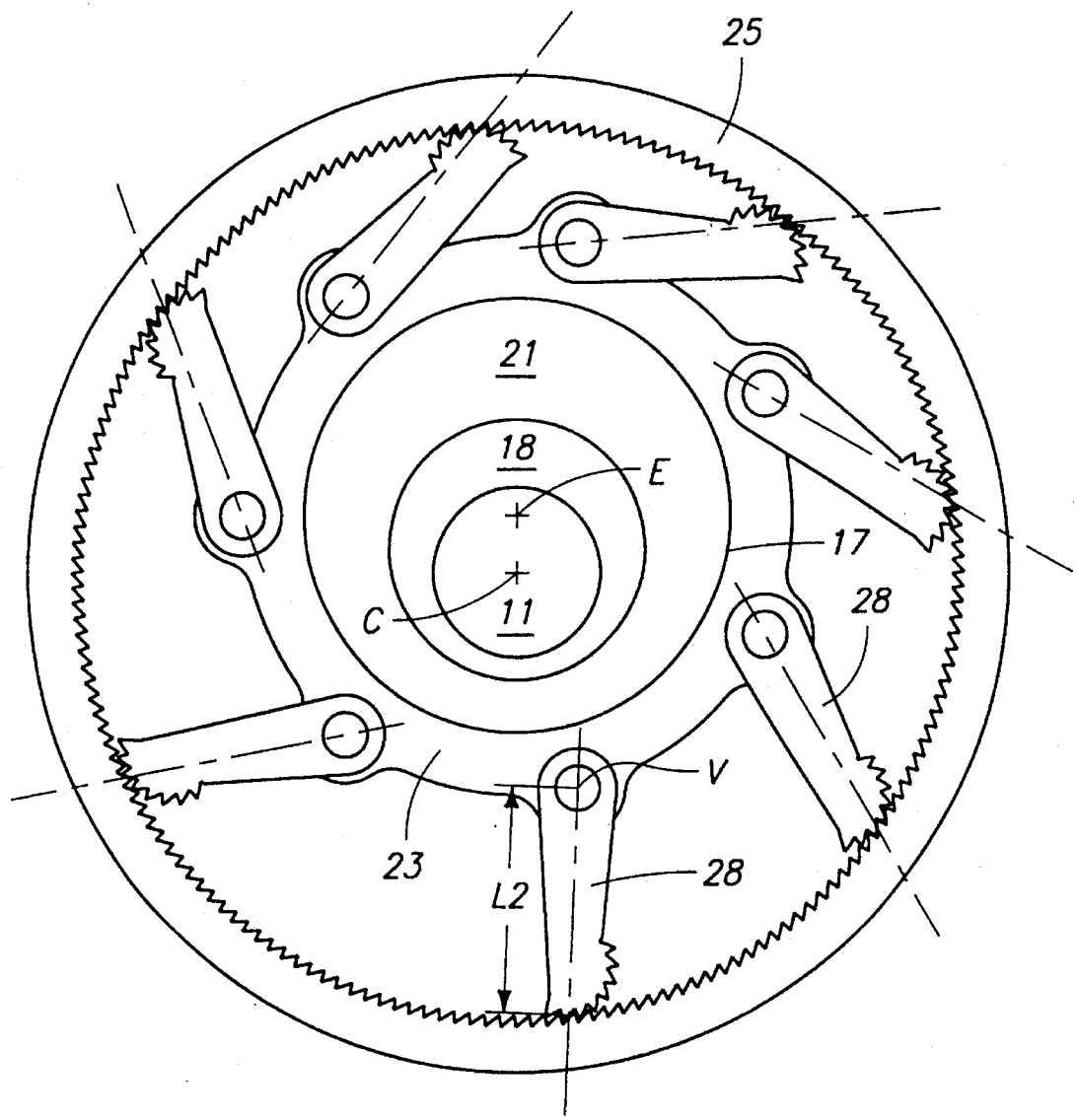
FIG. 8 is a simplified view illustrating operation of the anchor vanes.

In the illustrated embodiment, the teeth 36 formed across the outer end of each vane 28, 31, are arranged about an arc that is not centered about its vane axis (designated by the letter V in FIGS. 6 and 7. Instead, the teeth 35 are formed about a noncircular arcuate surface extending across the end and front face of each vane, thereby presenting a continuous series of intermeshing teeth as the vane rocks relative to the engaged axial elements. Because the arc is not centered about the vane axis, the working length of the vane relative to its vane axis will constantly vary as a function of the angular position of the vane relative to the orbiter 33.

As shown, the maximum working length of each anchor vane 28 is greater than the maximum radial separation between the first set of vane axes connecting the anchor vanes 28 to orbiter 33 and the internal teeth about the anchor ring or second axial element 25. Similarly, the maximum working length of each drive vane 31 is greater than the maximum radial separation between the second set of vane axes which interconnect the drive vanes 31 and orbiter 33 and the internal teeth formed about the drive ring or second axial element 26. Because of these length relationships, both the anchor and drive vanes 28, 31 are skewed relative to the orbiter—they do not attain an effective radial position. In addition, the sets of anchor and drive vanes 28 and 31 are skewed and face in opposite directions about orbiter 33, as can be clearly seen in FIG. 5.

According to the preferred embodiments of the invention, the maximum radial separation between the first set of vane axes (connecting anchor vanes 28 and orbiter 33) and the internal teeth of the anchor vane or second axial element 25 is greater than the maximum radial separation between the second set of vane axes (between the drive vanes 31 and orbiter 33) and the internal teeth of the drive ring or second axial element 26. This size relationship can be seen in FIGS. 2, 3 and 4. It is achieved due to the differing diameters of the anchor ring and drive ring.

Figure 5:
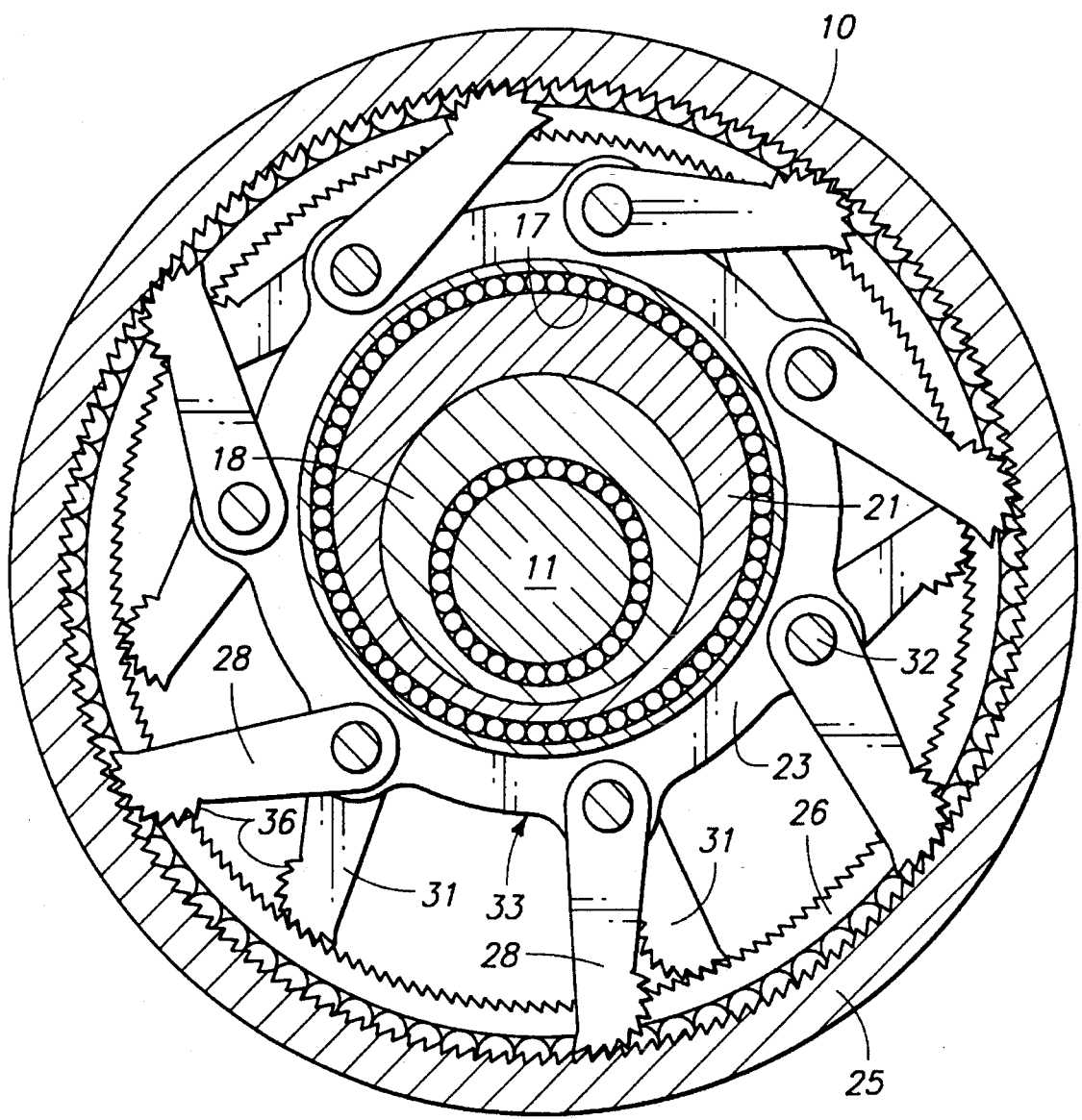
FIG. 5 is an enlarged view showing both the anchor vanes and drive vanes as seen along line 3—3 in FIG. 2.
Figure 10:
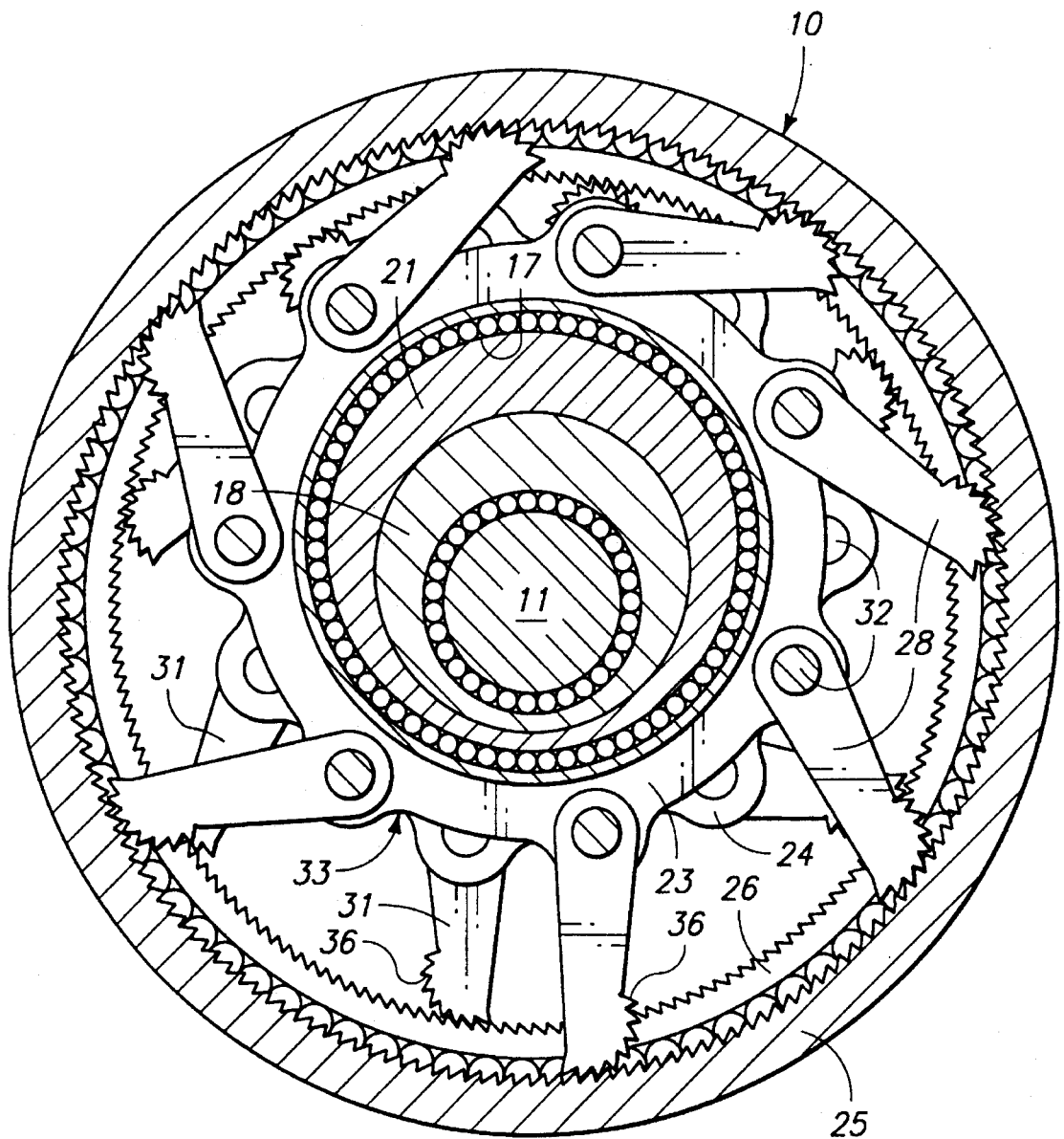
FIG. 10 is a view similar to FIG. 5, illustrating alternative pivot axes for the drive and anchor vanes.

In FIG. 5, the angular relationships of the anchor vanes 28 and drive vanes 31 are illustrated when they are pivoted about common axes on orbiter 33. FIG. 10 illustrates the overlapping pattern of vanes achieved when the respective axes or the anchor vanes 28 and drive vanes 31 are equally interspersed between one another. In both instances, the pivot axes are spaced equiangularly about the eccentric axis E—E.

Each vane 28 or 31 is spring biased outwardly toward the facing teeth 34 or 35. The biasing pressure on each vane is provided by individual springs 41 coiled about the supporting pivot pins 32 and having opposed ends that bear respectively on the orbiter 33 and back surface of the vane (see FIGS. 6 and 7). Springs 41 provide a light pivoting force on each vane that maintains the outer vane end in engagement with the teeth on the anchor ring or drive ring located outwardly from it.

Figure 11:
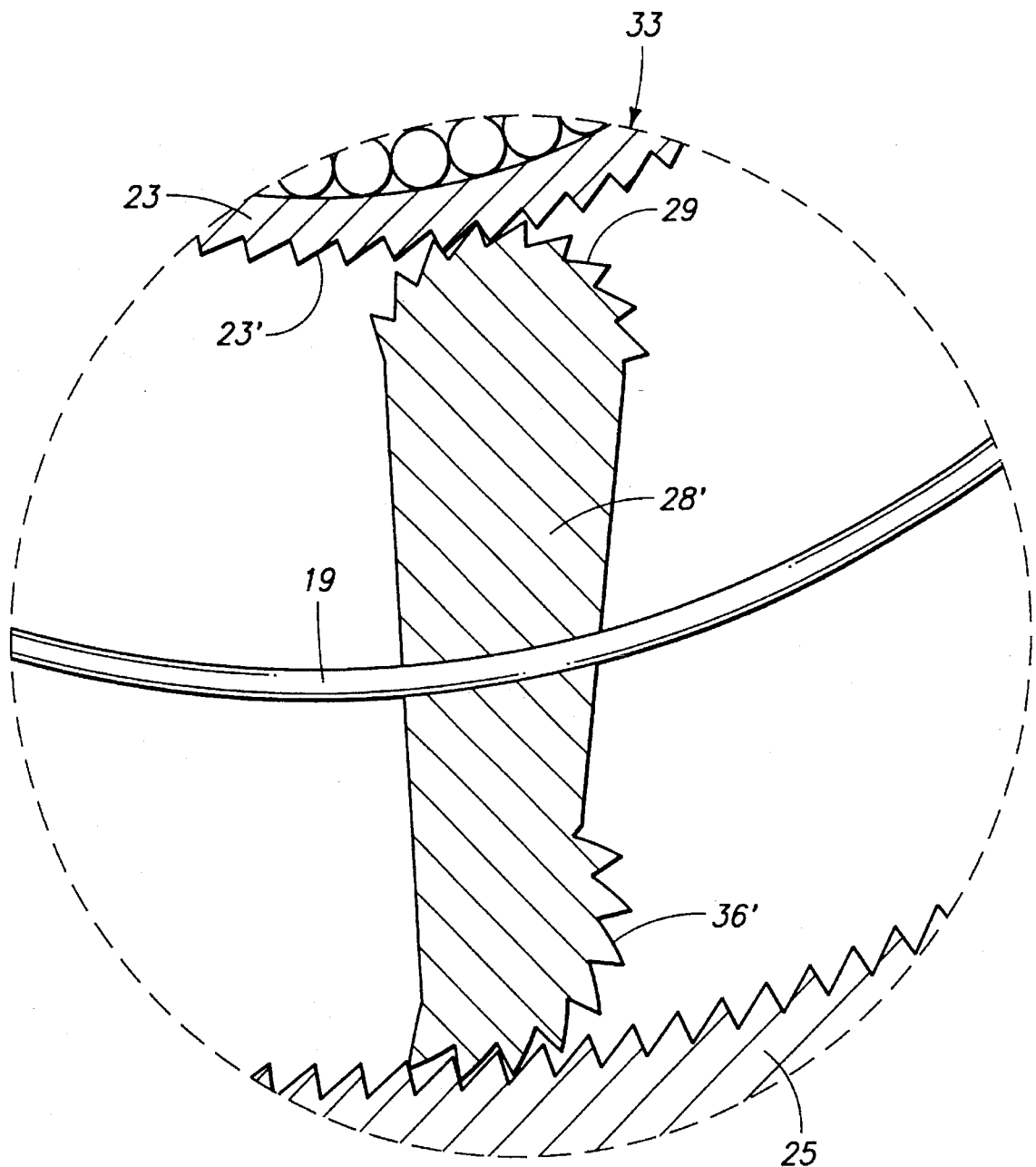
FIG. 11 is a view similar to FIG. 6, illustrating a second form of vane.

FIG. 11 shows a structural modification of an anchor vane 28'. It is to be understood that similar variations can be accomplished with respect to the previously-described drive vanes 31.

As shown in FIG. 11, the anchor vane 28' is provided with the same outer teeth 36' for engagement of teeth 34 on the anchor ring 25. However, in place of the previously-described pivot pins 32, the vanes 28' are drivingly connected to the orbiter 23 by means of an arcuate row of transverse teeth 29 which mesh with complementary teeth 23' formed about the periphery of the orbiter. Teeth 29 are formed on the circular arc centered across the base of vane 28' but an offset arcuate tooth pattern, as shown at the outer end of vane 28', can be utilized to further vary the working length of the vane 28' as it pivots relative to the rotational elements engaged by it.

A circular spring 19 extends through an aperture in the vane 28'. It extends continuously about the orbiter and yieldably holds all of the engaged vanes in contact with the toothed surface of the orbiter. Thus, the outer end of each vane is free to yieldably engage and disengage with the anchor ring 25, but the inner end will always remain in engagement as it rocks about a fixed or movable axis.

The adjusting gear mechanism 30 or shifter, which manually controls speed variations within the continuously variable transmission 40, can best be understood by viewing FIGS. 2 and 13–25. These figures illustrate the shifter in a neutral condition, wherein the speed ratio of transmission 40 remains unchanged during its use.

Figure 13:
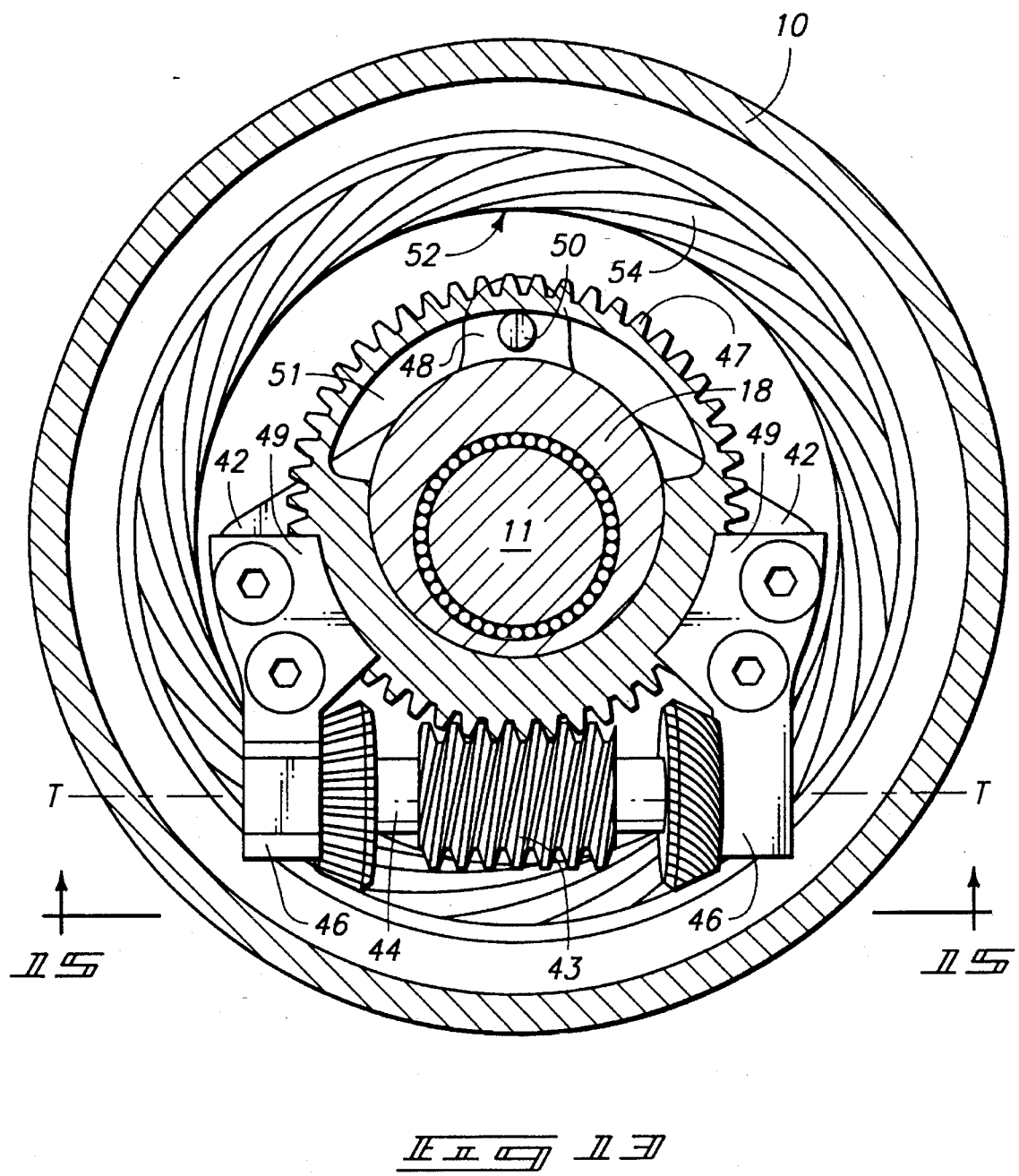
FIG. 13 is an enlarged cross-sectional view taken along line 13—13 in FIG. 2.
Figure 14:
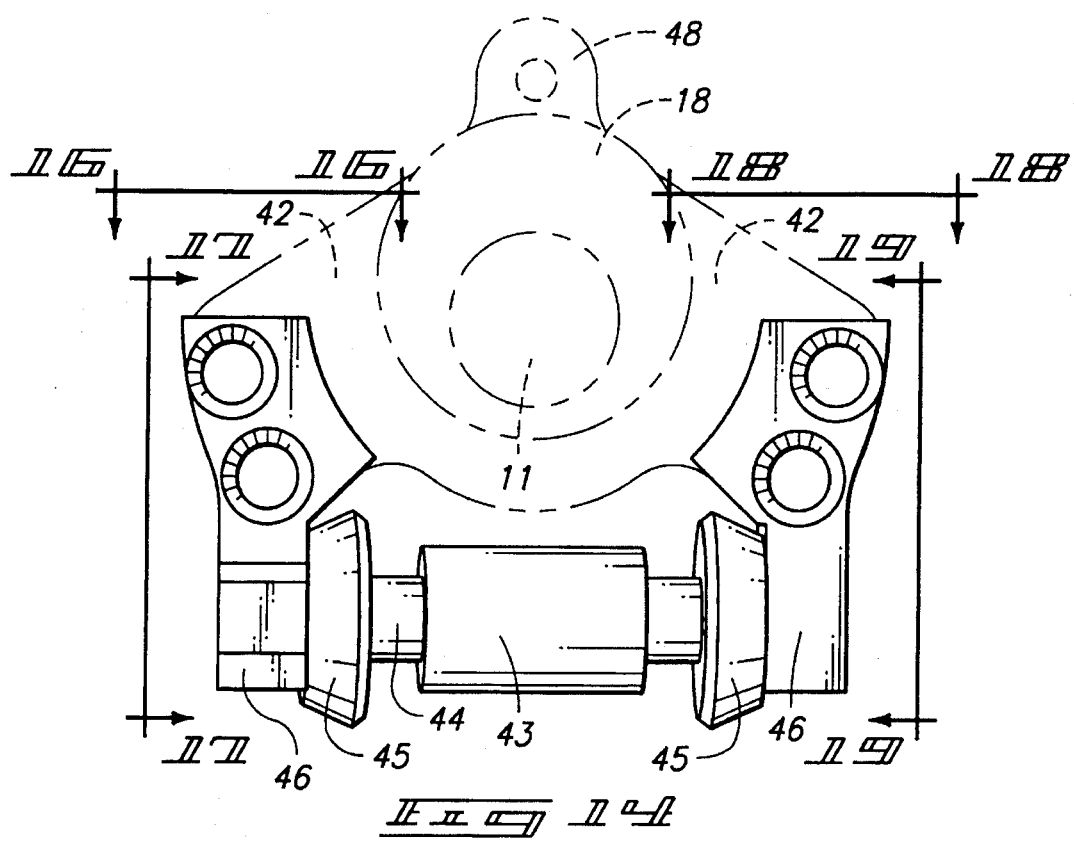
FIG. 14 is a diagrammatic transverse view showing the support structure for the worm shaft.
Figure 15:
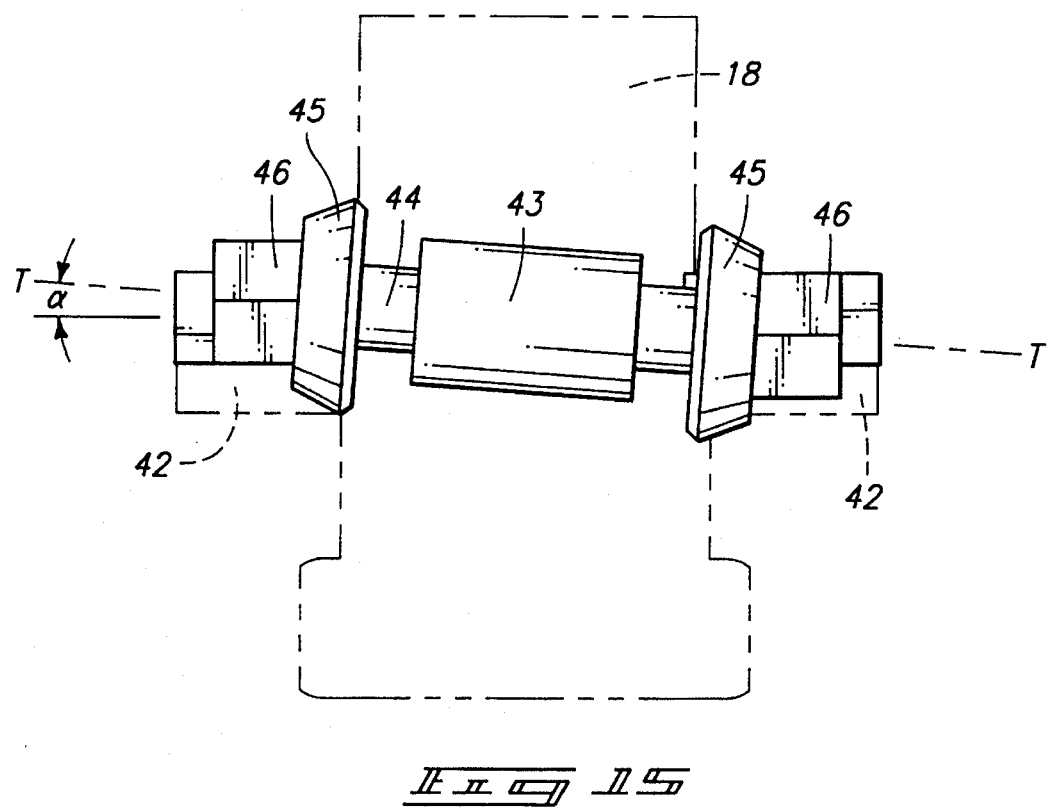
FIG. 15 is a diagrammatic bottom view of the support assembly shown in FIG. 14.
Figure 16:
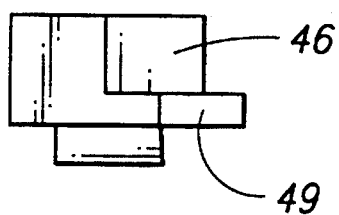
FIG. 16 is a top view of the left bushing cap shown in FIG. 14.
Figure 17:
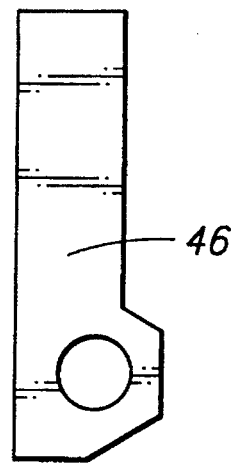
FIG. 17 is a side view of the left bushing cap.
Figure 18:
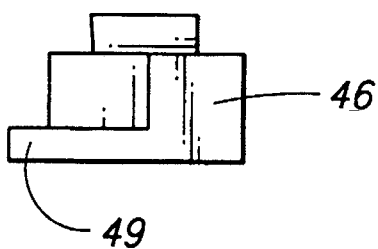
FIG. 18 is a top view of the right bushing cap shown in FIG. 14.
Figure 19:
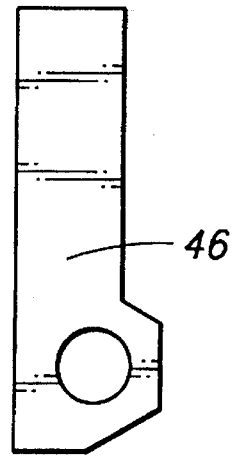
FIG. 19 is a side view of the right bushing cap.
Figure 22:
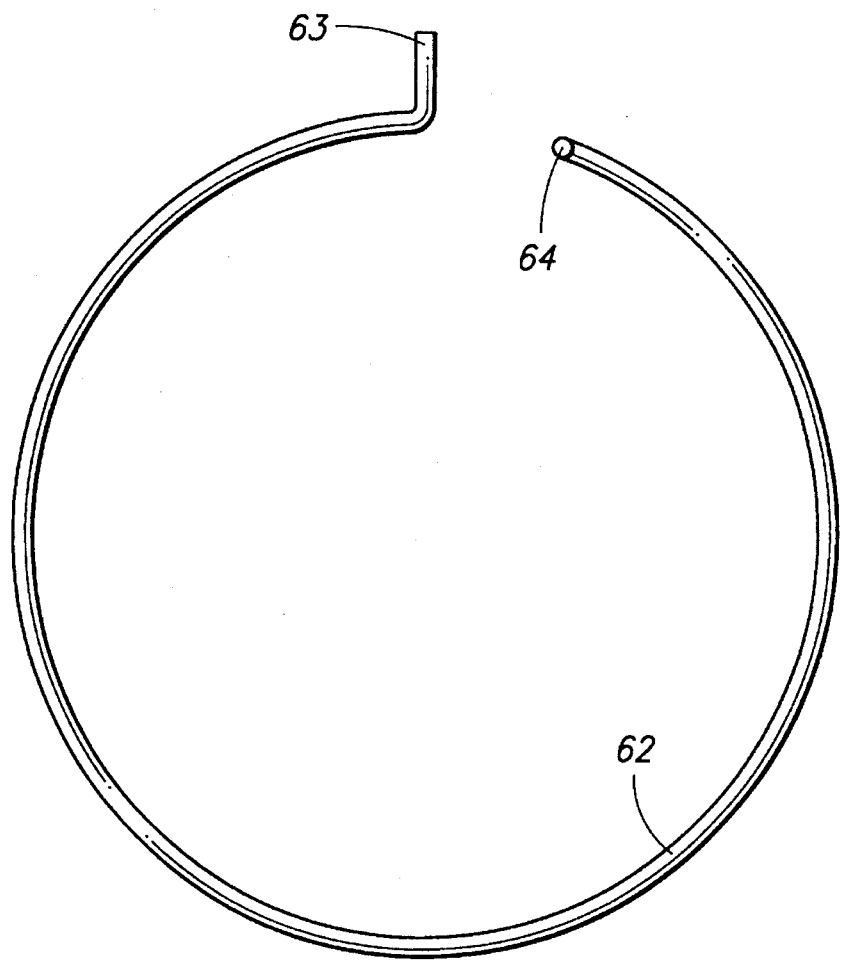
FIG. 22 is a side view of a first return spring.
Figure 23:
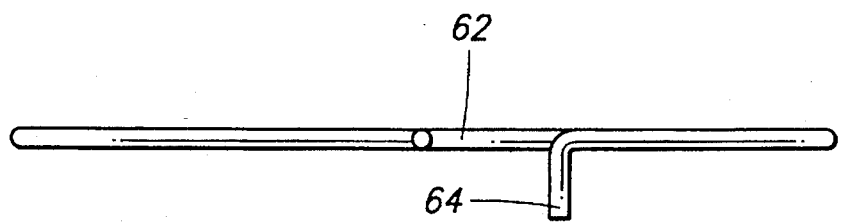
FIG. 23 is a top view of the spring showing FIG. 22.
Figure 24:
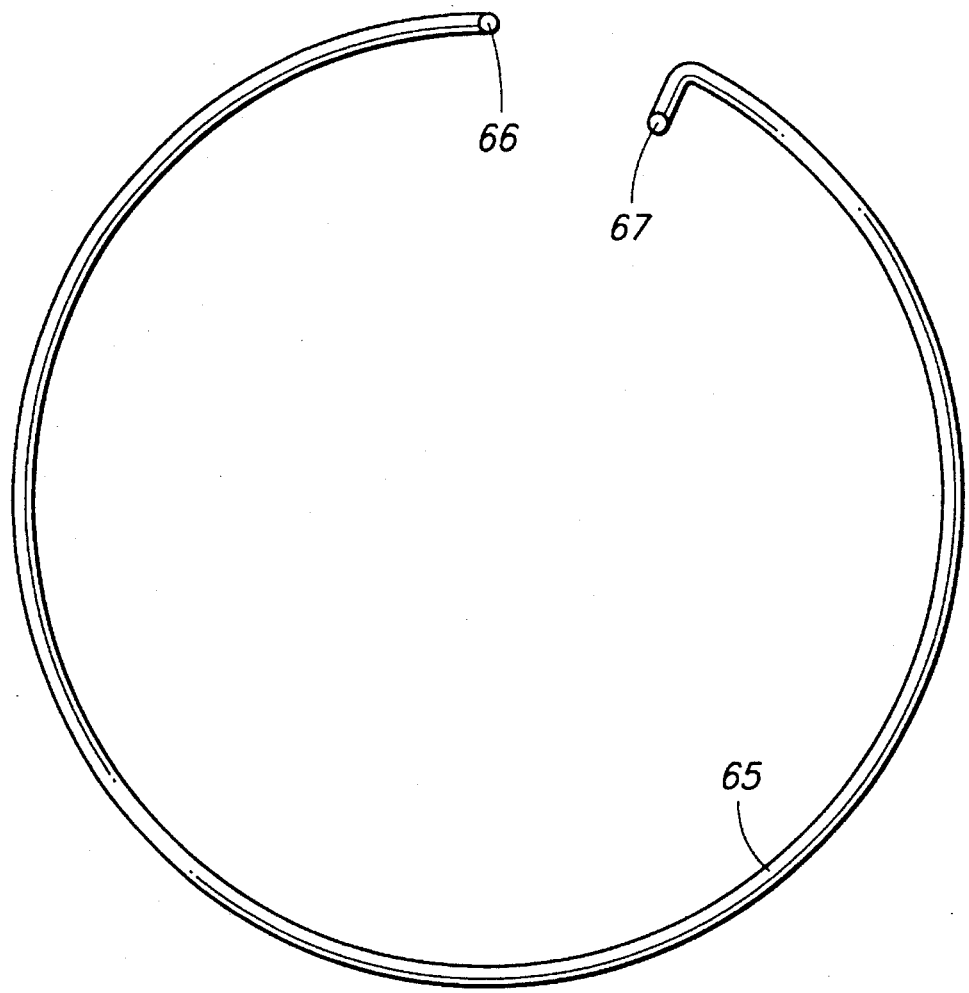
FIG. 24 is a side view of a second return spring.
Figure 25:
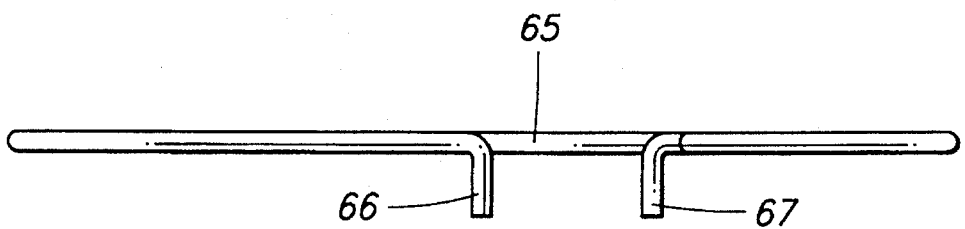
FIG. 25 is a top view of the spring showing FIG. 24.

As can be seen in FIG. 2, the inner end of the outer eccentric element 21 includes an annular flange in the form of a worm gear 47. Immediately adjacent to the worm gear 47 are radial wings 42 (FIGS. 13–15). The wings 42 are axially located on inner eccentric element 18 at a location identical to a protruding radial flange 48 shown in FIG. 2.

The radially extended wings 42 rotatably support opposite ends of a worm shaft 44, whose ends are journalled within bushing caps 46 fixed to the outer ends of the respective wings 42. Worm shaft 44 has a transverse worm 43 fixed across its center and two oppositely facing bevel drive gears 45 adjacent the opposed ends of worm 43.

The bushing caps 46 also include arcuate flanges 49 that overlap and slidably guide the periphery of worm gear 47 at both sides of the driving worm 43.

It is to be understood that the worm 43 rotates in unison with the shaft serving as inner eccentric element 18 and is also free to rotate about an axis T—T along the center of the worm shaft 44. Because the interconnection between a worm and a worm gear is not reversible, rotation of worm 43 will result in rotation of worm gear 47, but the two will remain in fixed relative positions unless rotational forces are being imparted to the controlling worm 43.

As can be seen in FIG. 15, the axis T—T of the worm shaft 44 is angularly offset from the worm gear 47, which is perpendicular to central axis C—C. The slight acute offset angle (3°) between the worm and worm gear is identified in FIG. 15 as angle α.

A pair of oppositely facing shift rings 52, 53 are arranged about the interior of housing 10 at axial positions immediately outward from the respective bevel drive gears 45 on worm shaft 44 (see FIGS. 2 and 13). Each shift ring 52, 53 is interengaged about the interior of housing 10 by fast lead threads that are formed in spirals. These threads are designed to impart substantial axial movement to the shift rings 52, 53 in response to relatively small pivotal movement about central axis C—C.

Each shift ring 52, 53 includes a bevel gear face 54 which matches the teeth formed about the conventional bevel drive gears 45 on worm shaft 44. The angular offset of worm shaft 44 assures that the respective shift rings 52 and 53, which have a common diametric size, will engage only one bevel drive gear 45 when moved inwardly toward the worm shaft 44.

The limits of adjustment between inner and outer eccentric elements 18, 21 are controlled by an axial shift limit pin 50 on the previously-described flange 48 and a complementary recess 51 (FIG. 13) formed in an arc about the transverse worm gear 47. The opposite ends of recess 51 limit relative angular movement between inner and outer eccentric elements 18 and 21 to the speed ratio range desired in a specific transmission application.

The rotational movement imparted to drive gears 45 as they engage the relatively stationary shift rings on the supporting housing 10, due to their rotational motion about the axis E—E, will rotate worm 43 in a first angular direction about central axis C—C in response to inward movement of shift ring 52. An opposite rotation will be imparted in response to inward movement and engagement of the bevel drive gear 45 by the second shift ring 53.

Shift rings 52, 53 are pivoted about the central axis C—C of housing 10 by means of a pair of shift cables 55, 56 (see FIGS. 20 and 21). The shift cables 55, 56 are threaded through cable openings that extend tangentially through housing 10 and the respective shift rings 52, 53. Cables 55 and 56 include conventional enlarged cable ends that abut the inner ends of the guiding cable openings.

The two shift cables 55, 56 subtend angles relative to central axis C—C which are identical to the adjacent fast lead threads through which the two shift rings 52 and 53 are respectively interconnected to the interior of housing 10. The rotational motion that results from application of tension to one or the other of the shaft cables 55, 56 will cause the interconnected shift ring 52 or 53 to move axially along housing 10 to selectively engage the adjacent bevel drive gear 45 on worm shaft 44.

Shift cables 55 and 56 can be interconnected to any conventional mechanism (not shown) for alternately applying tension force to one or the other of them. For instance, each cable 55 or 56 might lead to separate manual handles on a bicycle equipped with the present transmission. Alternately, the shift cables 55, 56 might lead to a common handle that exerts tension on one cable when moved in a first direction and on the other when it is moved in an opposite or second direction. The controlling mechanism and interconnecting cables 55 and 56 also serve as stops that define the disengaged or non-operative positions of the shift rings 52 and 53.

Shift rings 52 and 53 are yieldably biased to their disengaged or non-operative positions along housing 10. In the illustrated embodiment, yieldable rotational forces that act in resistance to rotational motion imparted to shift rings 52 and 53 by operation of the shift cables 55, 56 are exerted on the shift rings 52, 53 by first and second return springs 62 and 65, respectively.

The return springs 62 and 65 can be seen in the sectional view shown in FIG. 2, and are detailed in FIGS. 22–25.

A first return spring 62, which biases shift ring 52, includes an incomplete circular turn that normally rests against the inside of housing 10 at a location adjacent to the fast lead threads engaged by shift ring 52 (see FIG. 2). Similarly, the second return spring 65 normally rests against the inside surface of housing 10 adjacent to the fast lead threads that are engaged by shift ring 53.

The return springs 62 and 65 each include a protruding end 63 or 66 which projects into the walls of housing 10 and anchors one end of the spring relative to the housing. Similarly, the opposite ends of the return springs 62 and 65 include bent axial ends 64 and 67 which protrude into and are affixed to the respective shift rings 52 and 53.

In operation, very little cable movement is required to cause the shift rings 52 or 53 to spiral and move axially into engagement with the bevel drive gears 45. In a bicycle transmission, this engagement has been accomplished by approximately ¼ inch of cable movement, which results in approximately 10° of rotation about the affected shift ring 52 or 53. When pressure on the shift cables 55 or 56 is released, the return springs 62 or 65 cause the affected shift ring 52 or 53 to spiral back to its original position relative to housing 10.

While a manual shifter has been described and shown in this disclosure, it is to be understood that automatic shifting mechanisms can be utilized to control the relative angular positions of the inner and outer eccentric elements 18 and 21. Various mechanisms for affecting relative rotational movement in response to acceleration forces exerted on the transmission are well known and capable of being adapted to this purpose.

To summarize the operation of the hybrid transmission shown in the drawings, rotational movement imparted to the crank shaft 11 through pedal arms 13 causes the coaxial inner eccentric element 18 to be rotated at an increased rotational velocity relative to the rotational velocity of crank shaft 11. This increase in velocity is achieved through operation of the interposed planetary transmission 20. The downstream continuously variable transmission 40 is a reduced speed transmission capable of continuous variations in the output rotation imparted to sprocket 12 in a selected speed range. These operational limits are controlled by the physical limits of relative pivotal movement permitted between inner and outer eccentric elements 18 and 21 due to engagement of shift limit pin 50 against the opposite ends of the shift limit recess 51 formed about transverse worm 43 (see FIG. 13).

For instance, in a bicycle transmission wherein the planetary transmission 20 is designed to provide a 3:1 speed multiplication between the rotational velocity of crank shaft 11 and inner eccentric element 18, the recess 51 should be designed to always provide a minimum velocity at output sprocket 12 that is greater than zero and a maximum velocity which is a function of the design of the continuously variable transmission 40. A suitable speed ratio between the crank shaft 11 and output sprocket 12 for a bicycle is 0.2:1 to 1.14:1, which mimics standard ranges of speed variations provided by conventional change speed transmissions in use today.

While the illustrated transmission is located entirely within one housing 10, it is to be understood that the transmission components (the planetary transmission 20 and continuously variable transmission 40) could be located on rotationally interconnected shafts, such as the driven wheel hub and crank shaft of a bicycle. In other words, the planetary transmission might be located within the bottom bracket shell of the bicycle so that the inner eccentric element 18 is rotated in unison with the crank shaft 11. The output sprocket 12 and chain 22 would then drive the input of planetary transmission 20, which would then be located within the hub of the rear wheel on the bicycle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A continuously variable transmission, comprising:

a housing arranged about a central axis;

coaxial first and second rotatable members supported within the housing for independent rotation about the central axis;

an eccentric shaft operably connected to the first rotatable member for rotational movement about the central axis, the eccentric shaft having a cylindrical surface formed about an eccentric axis that is parallel to and radially adjustable relative to the central axis;

first axial elements located within the housing and centered about the eccentric axis;

second axial elements located within the housing and centered about the central axis, the second axial elements being radially displaced from and respectively facing the first axial elements;

the first axial elements being operably connected to the first rotatable member;

the second axial elements including one axial element fixed to the housing and a second axial element operably connected to the second rotatable member;

at least one of the first or second axial elements having a circular pattern of teeth formed thereon;

a first group of identical vanes operably engaging corresponding elements of the first and second axial elements; and a second group of identical vanes operably engaging corresponding elements of the first and second axial elements;

each vane having a first end operably connected to one axial clement for pivotal motion about a vane axis parallel to the central axis and a second end having a plurality of teeth complementary to and drivingly meshing with the circular pattern of teeth on a facing axial clement during a portion of each complete revolution of the eccentric shaft.

2. The continuously variable transmission of claim 1, wherein:

the teeth on each vane are arranged about an are that is not centered about its vane axis, whereby the working length of the vane relative to its vane axis varies as a function of the angular position of the vane about its vane axis.

3. The continuously variable transmission of claim 1, wherein the length of one group of vanes is greater than the length of the remaining group of vanes.

4. The continuously variable transmission of claim 1, wherein the first and second groups of vanes are skewed oppositely to one another about the first axial elements.

5. The continuously variable transmission of claim 1, wherein the eccentric shaft is rotatably journalled about the first rotatable member, the eccentric shaft including inner and outer eccentric elements independently rotatable relative to one another, the inner eccentric element being rotatably mounted about the first member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface.

6. The continuously variable transmission of claim 1, wherein the eccentric shaft is rotatably journalled about the first rotatable member, the eccentric shaft including inner and outer eccentric elements independently rotatable relative to one another, the inner eccentric element being rotatably mounted about the first member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface; and an adjusting gear mechanism operably connected between the inner and outer eccentric elements.

7. The continuously variable transmission of claim 1, wherein the eccentric shaft is rotatably journalled about the first rotatable member, the eccentric shaft including inner and outer eccentric elements independently rotatable relative to one another, the inner eccentric element being rotatably mounted about the first member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface;

a drive gear positioned at one end of a worm for rotation in unison with the worm about a worm shaft axis; and an annular shift ring centered about the central axis, the shift ring being movable axially along the central axis to selectively bring it into meshing engagement with the drive gear.

8. The continuously variable transmission of claim 1, wherein the eccentric shaft is rotatably journalled about the first rotatable member, the eccentric shaft including inner and outer eccentric elements independently rotatable relative to one another, the inner eccentric element being rotatably mounted about the first member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface;

a drive gear positioned at one end of a worm for rotation in unison with the worm about a worm shaft axis; and an annular shift ring centered about the central axis, the shift ring being movable axially along the central axis to selectively bring it into meshing engagement with the drive gear; and a spring biasing the shift ring to a position disengaged from the drive gear.

9. The continuously variable transmission of claim 1, wherein the eccentric shaft is rotatably journalled about the first rotatable member, the eccentric shaft including inner and outer eccentric elements independently rotatable relative to one another, the inner eccentric element being rotatably mounted about the first member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface;

first and second opposed drive gears positioned respectively at opposite ends of a worm for rotation in unison with the worm about a worm shaft axis; and a first annular shift ring centered about the central axis, the first shift ring being movable axially along the central axis to selectively bring it into meshing engagement with the drive gear;

a second annular shift ring centered about the central axis, the second shift ring being movable axially along the central axis to selectively bring it into meshing engagement with the second drive gear;

a first spring biasing the first shift ring to a position disengaged from the first drive gear; and a second spring biasing the second shift ring to a position disengaged from the second drive gear.

10. The continuously variable transmission of claim 1, wherein the eccentric shaft is rotatably journalled about the first rotatable member, the eccentric shaft including inner and outer eccentric elements independently rotatable relative to one another, the inner eccentric element being rotatably mounted about the first member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface;

a worm gear fixed to and surrounding one of the eccentric elements;

a worm in driving engagement with the worm gear, the worm being rotatably mounted to the remaining eccentric element for rotational motion in unison with it and for independent rotational motion about a worm shaft axis that is transverse to and radially spaced from the first axis; and a mechanism operably connected to the worm for selectively rotating the worm about the worm shaft axis.

11. The continuously variable transmission of claim 1, further comprising:

a planetary transmission interposed between the first member and the eccentric shaft.

12. The continuously variable transmission of claim 1, further comprising:

a planetary transmission interposed between the first rotatable member and the eccentric shaft, the planetary transmission comprising:

a ring gear fixed within the housing and centered about the central axis;

a sun gear rotatably mounted within the housing about the central axis, the sun gear being connected to the eccentric shaft; and a planet carrier within the housing, the planet carrier being rotatable about the central axis and connected to the first rotatable member, the planet carrier rotatably supporting a plurality of planetary gears in meshing engagement with both the ring and sun gears.

13. A continuously variable transmission, comprising:

a housing arranged about a central axis;

coaxial first and second rotatable members supported within the housing for independent rotation about the central axis;

an eccentric shaft operably connected to the first rotatable member for rotation in unison with it, the eccentric shaft having a cylindrical surface formed about an eccentric axis that is parallel to and radially adjustable relative to the central axis;

at least one orbiter rotatable about the cylindrical surface of the eccentric shaft;

an anchor ring and a drive ring located in axially spaced locations within the housing, each ring being spaced radially outward from and surrounding the orbiter and having a circular pattern of internal teeth centered about the central axis, the anchor ring being fixed relative to the housing and the drive ring being operably connected to the second rotatable member;

a plurality of identical rigid anchor vanes operably engaging the orbiter and the anchor ring, the anchor vanes having first ends operably connected to the orbiter for pivotal motion about a first set of vane axes parallel to and angularly spaced about the eccentric axis and second ends having a plurality of teeth complementary to and drivingly meshing with the internal teeth of the anchor ring during a portion of each complete revolution of the eccentric shaft; and a plurality of identical rigid drive vanes operably engaging the orbiter and the drive ring, the drive vanes having first ends operably connected to the orbiter for pivotal motion about a second set of vane axes parallel to and angularly spaced about the eccentric axis and second ends having a plurality of teeth complementary to and drivingly meshing with the internal teeth of the drive ring during a portion of each complete revolution of the eccentric shaft.

14. The continuously variable transmission of claim 13, wherein:

the teeth on each vane are arranged about an arc that is not centered about its vane axis, whereby the working length of the vane relative to its vane axis varies as a function of the angular position of the vane relative to the orbiter.

15. The continuously variable transmission of claim 13, wherein:

the housing is the bottom bracket shell of a bicycle;

the first rotatable member is a bicycle crank shaft; and the second rotatable member is an output sprocket.

16. The continuously variable transmission of claim 13, wherein:

the maximum working length of each anchor vane is greater than the radial separation between the first set of vane axes and the internal teeth of the anchor ring; and the maximum working length of each drive vane is greater than the maximum radial separation between the second set of vane axes and the internal teeth of the drive ring.

17. The continuously variable transmission of claim 13, wherein:

the maximum radial separation between the first set of vane axes and the internal teeth of the anchor ring is greater than the maximum radial separation between the second set of vane axes and the internal teeth of the drive ring and wherein the working lengths of the anchor vanes are greater than the corresponding working lengths of the drive vanes;

the maximum working length of each anchor vane is greater than the radial separation between the first set of vane axes and the internal teeth of the anchor ring; and the maximum working length of each drive vane is greater than the maximum radial separation between the second set of vane axes and the internal teeth of the drive ring.

18. The continuously variable transmission of claim 13, wherein the maximum radial separation between the first set of vane axes and the internal teeth of the anchor ring is greater than the maximum radial separation between the second set of vane axes and the internal teeth of the drive ring and wherein the length of the anchor vanes is greater than the length of the drive vanes; and the maximum working length of each anchor vane approaches the maximum radial separation between the first set of vane axes and the internal teeth of the anchor ring.

19. The continuously variable transmission of claim 13, wherein the minimum radial separation between the second set of vane axes and the internal teeth of the drive ring approaches zero.

20. The continuously variable transmission of claim 13, wherein the minimum radial separation between the second set of vane axes and the internal teeth of the drive ring approaches zero; and the maximum working length of each drive vane approaches the maximum radial separation between the second set of vane axes and the internal teeth of the drive ring.

21. A continuously variable transmission, comprising:

a housing arranged about a central axis;

coaxial driving and driven members supported within the housing for independent rotation about the central axis;

an eccentric shaft operably connected to the driving member, the eccentric shaft having a cylindrical surface formed about an eccentric axis that is parallel to and radially adjustable relative to the central axis;

at least one orbiter freely rotatable on the cylindrical surface of the eccentric shaft;

an anchor ring and a drive ring located in axially spaced locations within the housing, each ring being spaced radially outward from and surrounding the orbiter and having a circular pattern of internal teeth centered about the central axis, the anchor ring being fixed relative to the housing and the drive ring being operably connected to the driven member;

a plurality of identical rigid anchor vanes operably connected between the orbiter and the anchor ring, the anchor vanes having inner ends operably engaging the orbiter for pivotal motion about a first set of vane axes parallel to and angularly spaced about the eccentric axis and outer ends having a plurality of teeth complementary to and meshing with the internal teeth of the anchor ring; and a plurality of identical rigid drive vanes operably connected between the orbiter and the drive ring, the drive vanes having inner ends operably engaging the orbiter for pivotal motion about a second set of vane axes parallel to and angularly spaced about the eccentric axis and outer ends having a plurality of teeth complementary to and meshing with the internal teeth of the drive ring.

22. The continuously variable transmission of claim 21, wherein:

the teeth on each vane are arranged about an arc that is not centered about its vane axis, whereby the working length of the vane relative to its vane axis varies as a function of the angular position of the vane relative to the orbiter.

23. The continuously variable transmission of claim 21, wherein:

the maximum working length of each anchor vane is greater than the maximum radial separation between the first set of vane axes and the internal teeth of the anchor ring; and the maximum working length of each drive vane is greater than the maximum radial separation between the second set of vane axes and the internal teeth of the drive ring.

24. The continuously variable transmission of claim 21, wherein the anchor and drive vanes are skewed oppositely about the orbiter.

25. The continuously variable transmission of claim 21, wherein the maximum radial separation between the first set of vane axes and the internal teeth of the anchor ring is greater than the maximum radial separation between the second set of vane axes and the internal teeth of the drive ring.

26. The continuously variable transmission of claim 21, wherein the inner end of each anchor vane is pivoted to the orbiter about an axis parallel to the central axis and spaced equiangularly about the eccentric axis.

27. The continuously variable transmission of claim 21, wherein the inner end of each drive vane is pivoted to the orbiter about an axis parallel to the central axis and spaced equiangularly about the eccentric axis.

28. The continuously variable transmission of claim 21, wherein the inner ends of an anchor vane and an adjacent drive vane are pivoted to the orbiter about a common axis on the orbiter which is parallel to the central axis and spaced equiangularly about the eccentric axis.

29. The continuously variable transmission of claim 21, wherein the inner ends of the anchor vanes and drive vanes are pivoted to the orbiter about alternating axes at a common diameter on the orbiter, the axes being parallel to the central axis and spaced equiangularly about the eccentric axis.

30. The continuously variable transmission of claim 21, wherein the internal teeth of the anchor and drive rings are formed parallel to the central axis;

the anchor and drive vanes having oppositely facing arcuate surfaces formed at their respective outer ends, each arcuate surface including a plurality of axial teeth which are formed complementary to the internal teeth of the anchor and drive rings, respectively.

31. The continuously variable transmission of claim 21, further comprising:

springs operably connected between the orbiter and the anchor and drive vanes to maintain the outer end of each vane in engagement with the anchor and drive rings, respectively.

32. The continuously variable transmission of claim 21, wherein the anchor and drive rings have different inner diameters.

33. The continuously variable transmission of claim 21, wherein the inner diameter of the anchor ring is larger than the inner diameter of the drive ring.

34. The continuously variable transmission of claim 21, wherein the eccentric shaft is rotatably journalled about the driving member.

35. The continuously variable transmission of claim 21, wherein the eccentric shaft is rotatably journalled about the driving member, the eccentric shaft including inner and outer eccentric elements independently rotatable relative to one another, the inner eccentric element being rotatably mounted about the driving member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface.

36. The continuously variable transmission of claim 21, wherein the eccentric shaft is rotatably journalled about the driving member, the eccentric shaft including inner and outer eccentric elements independently rotatable relative to one another, the inner eccentric element being rotatably mounted about the driving member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface; and an adjusting gear mechanism operably connected between the inner and outer eccentric elements.

37. The continuously variable transmission of claim 21, wherein the eccentric shaft is rotatably journalled about the driving member, the eccentric shaft including inner and outer eccentric elements independently rotatable relative to one another, the inner eccentric element being rotatably mounted about the driving member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface;

a drive gear positioned at one end of a worm for rotation in unison with the worm about a worm shaft axis; and an annular shift ring centered about the central axis, the shift ring being movable axially along the central axis to selectively bring it into meshing engagement with the drive gear.

38. The continuously variable transmission of claim 21, wherein the eccentric shaft is rotatably journalled about the driving member, the eccentric shaft including inner and outer eccentric elements independently rotatable relative to one another, the inner eccentric element being rotatably mounted about the driving member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface;

a drive gear positioned at one end of a worm for rotation in unison with the worm about a worm shaft axis; and an annular shift ring centered about the central axis, the shift ring being movable axially along the central axis to selectively bring it into meshing engagement with the drive gear; and a spring biasing the shift ring to a position disengaged from the drive gear.

39. The continuously variable transmission of claim 21, wherein the eccentric shaft is rotatably journalled about the driving member, the eccentric shaft including inner and outer eccentric elements independently rotatable relative to one another, the inner eccentric element being rotatably mounted about the driving member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface;

first and second opposed drive gears positioned respectively at opposite ends of a worm for rotation in unison with the worm about a worm shaft axis;

a first annular shift ring centered about the central axis, the first shift ring being movable axially along the central axis to selectively bring it into meshing engagement with the drive gear;

a second annular shift ring centered about the central axis, the second shift ring being movable axially along the central axis to selectively bring it into meshing engagement with the second drive gear;

a first spring biasing the first shift ring to a position disengaged from the first drive gear; and a second spring biasing the second shift ring to a position disengaged from the second drive gear.

40. The continuously variable transmission of claim 21, further comprising:

a planetary transmission interposed between the driving member and the eccentric shaft.

41. The continuously variable transmission of claim 21, further comprising:

a planetary transmission interposed between the driving member and the eccentric shaft, the planetary transmission comprising:

a ring gear fixed within the housing and centered about the central axis;

a sun gear rotatably mounted within the housing about the central axis, the sun gear being fixed relative to the eccentric shaft; and a planet carrier within the housing, the planet carrier being freely rotatable about the central axis and rotatably supporting a plurality of planetary gears in meshing engagement with both the ring and sun gears.

42. A continuously variable bicycle transmission, comprising:

a bottom bracket shell arranged about a central axis;

a crank shaft rotatably mounted through the bottom bracket shell, the crank shaft being centered along the central axis;

a coaxial output sprocket rotatably supported within the bottom bracket shell and on the crank shaft for independent rotation about the central axis;

an eccentric shaft surrounding the crank shaft within the bottom bracket shell, the eccentric shaft having a cylindrical surface formed about an eccentric axis that is parallel to the central axis and radially adjustable relative to it;

an orbiter rotatably supported by the cylindrical surface of the eccentric shaft for free rotation about the eccentric axis;

an anchor ring and a drive ring located in axially spaced locations within the bottom bracket shell, each ring being spaced radially outward from and surrounding the orbiter and having a circular pattern of internal teeth centered about the central axis, the anchor ring being formed integrally with the bottom bracket shell and the drive ring being formed integrally with the output sprocket;

a plurality of identical rigid anchor vanes operably connected between the orbiter and the anchor ring, the anchor vanes having inner ends pivotally connected to the orbiter for motion about a first set of vane axes parallel to and angularly spaced about the eccentric axis and outer ends having a plurality of teeth complementary to and meshing with the internal teeth of the anchor ring; and a plurality of identical rigid drive vanes operably connected between the orbiter and the drive ring, the drive vanes having inner ends pivotally connected to the orbiter for motion about a second set of vane axes parallel to and angularly spaced about the eccentric axis and outer ends having a plurality of teeth complementary to and meshing with the internal teeth of the drive ring.

43. The continuously variable bicycle transmission of claim 42, wherein:

the teeth on each vane are arranged about an arc that is not centered about its vane axis, whereby the working length of the vane relative to its vane axis is a function of the angular position of the vane relative to the orbiter.

44. The continuously variable bicycle transmission of claim 42, wherein the internal teeth of the anchor and drive rings are formed parallel to the central axis;

the anchor and drive vanes having oppositely facing arcuate surfaces formed at their respective outer ends, each arcuate surface including a plurality of axial teeth which are formed complementary to the internal teeth of the anchor and drive rings, respectively.

45. The continuously variable bicycle transmission of claim 42, further comprising:

springs operably connected between the orbiter and the anchor and drive vanes to maintain the outer end of each vane in engagement with the anchor and drive rings, respectively.

46. The continuously variable bicycle transmission of claim 42, wherein the anchor and drive rings have different inner diameters.

47. The continuously variable bicycle transmission of claim 42, wherein the inner diameter of the anchor ring is larger than the inner diameter of the drive ring.

48. The continuously variable transmission of claim 42, wherein the eccentric shaft includes inner and outer eccentric elements independently rotatable relative to one another, the inner eccentric element being rotatably mounted about the crank shaft member and having an inner cylindrical surface and an eccentric outer cylindrical surface, the outer eccentric element being rotatably mounted about the eccentric outer cylindrical surface of the inner eccentric member and having an inner cylindrical surface and an eccentric outer cylindrical surface; and an adjusting gear mechanism operably connected between the inner and outer eccentric elements.

49. An adjustable eccentric shaft, comprising:

first and second eccentric elements independently rotatable relative to one another;

the first eccentric element being rotatably journalled about a first axis and having an eccentric cylindrical outer surface formed about a first eccentric axis that is parallel to and radially spaced from the first axis;

the second eccentric element being rotatably mounted about the eccentric cylindrical surface of the first eccentric member and further having an eccentric cylindrical outer surface formed about a second eccentric axis that is parallel to and radially adjustable relative to the first axis by rotation of one eccentric element relative to the other;

a worm gear fixed to and surrounding the first eccentric element;

a worm in driving engagement with the worm gear, the worm being rotatably mounted to the second eccentric element for rotational motion in unison with it about the first eccentric axis and for independent rotational motion about a worm shaft axis that is transverse to and radially spaced from the first axis; and a mechanism operably connected to the worm for selectively rotating the worm about the worm shaft axis.

50. The adjustable eccentric shaft of claim 49, further comprising:

a shaft rotatably mounted about the first axis, the shaft having an outer cylindrical surface that is centered about the first axis;

the inner eccentric element having an inner cylindrical surface rotatably mounted about the cylindrical surface of the shaft for independent rotational motion of the inner eccentric element and shaft about the first axis.

51. The adjustable eccentric shaft of claim 49, further comprising:

a shaft rotatably mounted about the first axis, the shaft having an outer cylindrical surface that is centered about the first axis;

the inner eccentric element having an inner cylindrical surface rotatably mounted about the cylindrical surface of the shaft for independent rotational motion of the inner eccentric element and shaft about the first axis; and a planetary transmission operably connected between the shaft and the inner eccentric element.

52. The adjustable eccentric shaft of claim 49 wherein the worm shaft axis is angularly offset from a plane that is perpendicular to the first axis.

53. The adjustable eccentric shaft of claim 49 wherein the mechanism operably connected to the worm comprises:

a drive gear positioned at one end of the worm for rotation in unison with the worm about the worm shaft axis; and an annular shift ring centered about the first axis, the shift ring being movable axially along the first axis to selectively bring it into meshing engagement with the drive gear.

54. The adjustable eccentric shaft of claim 49 wherein the mechanism operably connected to the worm comprises:

a drive gear positioned at one end of the worm for rotation in unison with the worm about the worm shaft axis;

an annular shift ring centered about the first axis, the shift ring being movable axially along the first axis to selectively bring it into meshing engagement with the drive gear; and a spring biasing the shift ring to a position disengaged from the drive gear.

55. The adjustable eccentric shaft of claim 49 wherein the mechanism operably connected to the worm comprises:

first and second opposed drive gears positioned at opposite ends of the worm for rotation in unison with the worm about the worm shaft axis;

a first annular shift ring centered about the first axis, the first shift ring being movable axially along the first axis to selectively bring it into meshing engagement with the first drive gear; and a second annular shift ring centered about the first axis, the second shift ring being movable axially along the first axis to selectively bring it into meshing engagement with the second drive gear.

56. The adjustable eccentric shaft of claim 49 wherein the mechanism operably connected to the worm comprises:

first and second opposed drive gears positioned respectively at opposite ends of the worm for rotation in unison with the worm about the worm shaft axis;

a first annular shift ring centered about the first axis, the first shift ring being movable axially along the first axis to selectively bring it into meshing engagement with the first drive gear;

a second annular shift ring centered about the first axis, the second shift ring being movable axially along the first axis to selectively bring it into meshing engagement with the second drive gear;

a first spring biasing the first shift ring to a position disengaged from the first drive gear; and a second spring biasing the second shift ring to a position disengaged from the second drive gear.

57. The adjustable eccentric shaft of claim 49, further comprising:

a housing centered about the first axis and surrounding the first and second eccentric elements;

the mechanism operably connected to the worm comprising:

a drive gear positioned at one end of the worm for rotation in unison with the worm about the worm shaft axis; and an annular shift ring centered about the first axis within the housing, the shift ring being movably supported by the housing for axial motion along the first axis to selectively bring it into meshing engagement with the drive gear.

58. The adjustable eccentric shaft of claim 49, further comprising:

a housing centered about the first axis and surrounding the first and second eccentric elements;

the mechanism operably connected to the worm comprising:

a drive gear positioned at one end of the worm for rotation in unison with the worm about the worm shaft axis; and an annular shift ring centered about the first axis within the housing, the shift ring being movably supported by spiral threads formed on the housing for axial motion along the first axis in response to rotational motion of the shift ring about the first axis to selectively bring it into meshing engagement with the drive gear; and a spring operably engaged between the shift ring and the housing for rotationally biasing the shift ring about the first axis to a position disengaged from the drive gear.

59. The adjustable eccentric shaft of claim 49, further comprising:

a housing centered about the first axis and surrounding the first and second eccentric elements;

the mechanism operably connected to the worm comprising:

first and second opposed drive gears positioned respectively at opposite ends of the worm for rotation in unison with the worm about the worm shaft axis;

a first annular shift ring centered about the first axis within the housing, the first shift ring being movably supported by spiral threads formed on the housing for axial motion along the first axis in response to rotational motion of the shift ring about the first axis to selectively bring it into meshing engagement with the first drive gear;

a second annular shift ring centered about the first axis within the housing, the second shift ring being movably supported by the housing for axial motion along the first axis to selectively bring it into meshing engagement with the second drive gear;

a first spring operably engaged between the shift ring and the housing, the first spring pivotally biasing the first shift ring to a position disengaged from the first drive gear; and a second spring operably engaged between the shift ring and the housing, the second spring pivotally biasing the second shift ring to a position disengaged from the second drive gear.

60. The adjustable eccentric shaft of claim 49, further comprising:

a housing centered about the first axis and surrounding the first and second eccentric elements;

the mechanism operably connected to the worm comprising:

first and second opposed drive gears positioned respectively at opposite ends of the worm for rotation in unison with the worm about the worm shaft axis;

a first annular shift ring centered about the first axis within the housing, the first shift ring being movably supported by the housing for axial motion along the first axis in response to rotational motion of the first shift ring about the first axis to selectively bring it into meshing engagement with the first drive gear;

a second annular shift ring centered about the first axis within the housing, the second shift ring being movably supported by the housing for axial motion along the first axis in response to rotational motion of the second shift ring about the first axis to selectively bring it into meshing engagement with the second drive gear;

a first spring engaged between the first shift ring and the housing for rotationally biasing the first shift ring to a position disengaged from the first drive gear; and a second spring engaged between the second shift ring and the housing for rotationally biasing the second shift ring to a position disengaged from the second drive gear.

61. The adjustable eccentric shaft of claim 49, further comprising:

a housing centered about the first axis and surrounding the first and second eccentric elements;

the mechanism operably connected to the worm comprising:

first and second opposed drive gears positioned respectively at opposite ends of the worm for rotation in unison with the worm about the worm shaft axis;

a first annular shift ring centered about the first axis within the housing, the first shift ring being movably supported by the housing for axial motion along the first axis in response to rotational motion of the first shift ring about the first axis to selectively bring it into meshing engagement with the first drive gear;

a second annular shift ring centered about the first axis within the housing, the second shift ring being movably supported by the housing for axial motion along the first axis in response to rotational motion of the second shift ring about the first axis to selectively bring it into meshing engagement with the second drive gear;

a first spring engaged between the first shift ring and the housing for rotationally biasing the first shift ring to a position disengaged from the first drive gear;

a second spring engaged between the second shift ring and the housing for rotationally biasing the second shift ring to a position disengaged from the second drive gear;

a first cable having one end fixed to the first shift ring for imparting rotational motion to the first shift ring about the first axis in response to tension forces applied to the first cable; and a second cable having one end fixed to the second shift ring for imparting rotational motion to the second shift ring about the first axis in response to tension forces applied to the second cable.

62. An adjustable eccentric shaft, comprising:

a housing centered about a first axis;

a central drive shaft extending through the housing for rotational motion about the first axis, the central drive shaft having an outer cylindrical surface that is centered about the first axis;

first and second eccentric shafts axially overlapping one another and the central drive shaft within the housing, the first and second eccentric shafts being independently rotatable relative to one another;

the first eccentric shaft including a cylindrical inner surface rotatably journalled about the outer cylindrical surface of the central drive shaft and further having an eccentric cylindrical outer surface formed about a first eccentric axis that is parallel to and radially spaced from the first axis;

the second eccentric shaft including a cylindrical inner surface rotatably journalled about the eccentric cylindrical outer surface of the first eccentric shaft and further having an eccentric cylindrical outer surface formed about a second eccentric axis that is parallel to the first axis and radially adjustable relative to it by rotation of the one eccentric shaft relative to the other;

a planetary transmission operably connected between the central drive shaft and the first eccentric element;

a worm gear fixed to and surrounding one of the eccentric shafts;

a worm in driving engagement with the worm gear, the worm being rotatably mounted to the remaining eccentric shaft for rotational motion in unison with it about the first eccentric axis and for independent rotational motion about a worm shaft axis that is transverse to and radially spaced from the first axis;

a drive gear positioned at one end of the worm for rotation in unison with the worm about the worm shaft axis;

an annular shift ring centered about the first axis within the housing, the shift ring being movably supported by spiral threads formed on the housing for axial motion along the first axis in response to rotational motion of the shift ring about the first axis to selectively bring it into meshing engagement with the drive gear; and a spring operably engaged between the shift ring and the housing for rotationally biasing the shift ring about the first axis to a position disengaged from the drive gear.

63. The adjustable eccentric shaft of claim 62 wherein the worm shaft axis is angularly offset from a plane that is perpendicular to the first axis.

64. The adjustable eccentric shaft of claim 62, further comprising:

a cable having one end fixed to the shift ring for imparting rotational motion to the shift ring about the first axis in response to tension forces applied to the cable.

65. An adjustable eccentric shaft, comprising:

a housing centered about a first axis;

a central drive shaft extending through the housing for rotational motion about the first axis, the central drive shaft having an outer cylindrical surface that is centered about the first axis;

first and second eccentric shafts axially overlapping one another and the central drive shaft within the housing, the first and second eccentric shafts being independently rotatable relative to one another;

the first eccentric shaft including a cylindrical inner surface rotatably journalled about the outer cylindrical surface of the central drive shaft and further having an eccentric cylindrical outer surface formed about a first eccentric axis that is parallel to and radially spaced from the first axis;

the second eccentric shaft including a cylindrical inner surface rotatably journalled about the eccentric cylindrical outer surface of the first eccentric shaft and further having an eccentric cylindrical outer surface formed about a second eccentric axis that is parallel to the first axis and radially adjustable relative to it by rotation of the one eccentric shaft relative to the other;

a planetary transmission operably connected between the central drive shaft and the first eccentric element;

a worm gear fixed to and surrounding one of the eccentric shafts;

a worm in driving engagement with the worm gear, the worm being rotatably mounted to the remaining eccentric shaft for rotational motion in unison with it about the first eccentric axis and for independent rotational motion about a worm shaft axis that is transverse to and radially spaced from the first axis;

first and second opposed drive gears positioned respectively at opposite ends of the worm for rotation in unison with the worm about the worm shaft axis;

a first annular shift ring centered about the first axis within the housing, the first shift ring being movably supported by spiral threads formed on the housing for axial motion along the first axis in response to rotational motion of the shift ring about the first axis to selectively bring it into meshing engagement with the first drive gear;

a second annular shift ring centered about the first axis within the housing, the second shift ring being movably supported by the housing for axial motion along the first axis to selectively bring it into meshing engagement with the second drive gear;

a first spring operably engaged between the shift ring and the housing, the first spring pivotally biasing the first shift ring to a position disengaged from the first drive gear; and a second spring operably engaged between the shift ring and the housing, the second spring pivotally biasing the second shift ring to a position disengaged from the second drive gear.

66. The adjustable eccentric shaft of claim 65 wherein the worm shaft axis is angularly offset from a plane that is perpendicular to the first axis.

67. The adjustable eccentric shaft of claim 65, further comprising:

a first cable having one end fixed to the first shift ring for imparting rotational motion to the first shift ring about the first axis in response to tension forces applied to the first cable; and a second cable having one end fixed to the second shift ring for imparting rotational motion to the second shift ring about the first axis in response to tension forces applied to the second cable.

* * * * *